US011394255B2

United States Patent
Pilgrim et al.

(10) Patent No.: US 11,394,255 B2
(45) Date of Patent: Jul. 19, 2022

(54) SPLIT ELECTRIC MACHINE FOR RETROFIT HYBRID PROPULSION SYSTEMS

(71) Applicant: Duxion Motors, Inc., St. Johns's (CA)

(72) Inventors: Rick Ralph Pilgrim, Grand Falls-Windsor (CA); Sheikh Fazle Rabbi, St. John's (CA); Jason Aspin, Stratford (CA); Dipesh Maharjan, St. John's (CA); Richard Robert Roper, Katy, TX (US)

(73) Assignee: Duxion Motors, Inc., St. John's (CA)

( * ) Notice: Subject to any disclaimer, the term of this patent is extended or adjusted under 35 U.S.C. 154(b) by 0 days.

(21) Appl. No.: 17/525,309

(22) Filed: Nov. 12, 2021

(65) Prior Publication Data

US 2022/0077727 A1     Mar. 10, 2022

Related U.S. Application Data

(63) Continuation of application No. 17/327,390, filed on May 21, 2021.

(60) Provisional application No. 63/029,089, filed on May 22, 2020.

(51) Int. Cl.
    *H02K 1/16*         (2006.01)
    *H02K 9/19*         (2006.01)
    *H02K 1/27*         (2022.01)
    *H02K 19/06*       (2006.01)
    *H02K 7/00*         (2006.01)
    *H02K 7/08*         (2006.01)

(52) U.S. Cl.
CPC ................ *H02K 1/16* (2013.01); *H02K 1/27* (2013.01); *H02K 7/003* (2013.01); *H02K 7/08* (2013.01); *H02K 9/19* (2013.01); *H02K 19/06* (2013.01)

(58) Field of Classification Search
CPC ............ H02K 1/16; H02K 1/27; H02K 7/003; H02K 7/08; H02K 9/19; H02K 19/06
USPC ................................ 310/52, 156.53, 156.56
See application file for complete search history.

(56) References Cited

U.S. PATENT DOCUMENTS

| 5,341,076 | A | 8/1994 | Bahn | |
|---|---|---|---|---|
| 6,265,804 | B1 | 7/2001 | Nitta et al. | |
| 8,358,046 | B2 | 1/2013 | Platon | |
| 9,502,930 | B2 * | 11/2016 | Huang | H02K 1/246 |
| 9,948,152 | B2 * | 4/2018 | Bhargava | D06F 37/304 |

(Continued)

FOREIGN PATENT DOCUMENTS

| CA | 2710706 | | 7/2009 | |
|---|---|---|---|---|
| CA | 2430000 | * | 10/2010 | ............... H02K 9/19 |

(Continued)

OTHER PUBLICATIONS

PCT Application No. PCT/IB2021-054458 International Search Report and Written Opinion, dated Aug. 23, 2021, 12 pgs.

*Primary Examiner* — Terrance L Kenerly

(74) *Attorney, Agent, or Firm* — Fletcher Yoder, P.C.

(57) ABSTRACT

A device includes a first rotor segment and a second rotor segment, wherein the first rotor segment and the second rotor segment are configured to be directly coupled together about a shaft to form at least a portion of a unitary rotor. The device also includes a first stator segment and a second stator segment, wherein the first stator segment and the second stator segment are configured to be directly coupled together to form at least a portion of a unitary stator.

20 Claims, 24 Drawing Sheets

(56) References Cited

U.S. PATENT DOCUMENTS

2016/0141926 A1* 5/2016 Kano .................... H02K 1/276
310/156.53
2016/0254712 A1* 9/2016 Pan ...................... H02K 1/276
310/156.53

FOREIGN PATENT DOCUMENTS

| CN | 109586506 | 4/2019 |
| KR | 102067405 | 1/2020 |

* cited by examiner

SPLIT ELECTRIC MACHINE FOR RETROFIT HYBRID PROPULSION SYSTEMS

CROSS REFERENCE TO RELATED APPLICATIONS

This application is a Continuation Application of U.S. application Ser. No. 17/327,390, entitled, "Split Permanent Magnet Electric Machine for Retrofit Hybrid Propulsion Systems", filed May 21, 2021, which is a Non-Provisional application claiming priority to U.S. Provisional Patent Application No. 63/029,089, entitled "Split Permanent Magnet Electric Machine for Retrofit Hybrid Propulsion Systems", filed May 22, 2020, which is herein incorporated by reference.

FIELD

This disclosure relates generally to retrofit hybrid propulsion systems, and more specifically to split permanent magnet electric machines for retrofit hybrid propulsion systems for marine vessels.

INTRODUCTION

Hybrid technology is starting to become more and more accepted in the marine industry as a method of reducing the fuel consumption and the emissions associated with carrying out the industrial marine mission of a vessel.

A vessel's suitability to hybrid technology mainly depends on its duty cycle and operational profile. For example, an application that is typically well suited for hybrid propulsion is one in which the vessel design is based on a broad spectrum of power needs, yet a significant amount of the time is expected to be spent at low power. Vessels that may fit this profile include patrol boats, tug boats, work boats, offshore supply vessels (OSVs), platform supply vessels (PSVs), pilot vessels, research vessels, fishing boats, buoy tenders, ice breakers, navy vessels, and many more.

When a vessel is being considered for new construction, application of hybrid technology may not be considered difficult to integrate into the vessel design, and the additional capital expenditures may be offset by expected future savings (e.g. fuel expenses). The majority of the vessels that will operate over the next 30 years are already built, and except for a very small number of early adopters, these existing vessels are fitted with conventional power systems.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document.

There is a large opportunity for hybridization of existing vessels that have an operational profile that supports a hybrid design. There are only a few examples worldwide of successful conversion of existing vessels to hybrid power systems. This is in part due to challenges associated with any vessel conversion. Also, modification of propulsion shaft lines to integrate an electric motor into a conventional propulsion mechanical drive line is currently a disruptive and costly exercise. The associated loss of revenue for the vessel and cost of modification will typically remove the business case for hybrid conversion. Conventional electric motor design prevents the electric machine from being fitted in the propulsion system without interrupting the shaft line.

In the systems disclosed herein, a split permanent magnet electric machine design can be fitted to existing propulsion shaft lines without the need to interrupt or modify the existing shaft. This may lead to decreased installation time and/or costs for retrofitting existing vessels with hybrid power systems. For example, the split permanent magnet electric machine may be modular and/or scalable to facilitate its installation in a wide variety of vessel types.

Such split permanent magnet electric machines may help realize the environmental benefits that can be achieved by making the hybridization of existing vessels commercially viable. This has the potential to significantly reduce the environmental impact associated with marine operations in Canada and around the world.

In systems disclosed herein, a permanent magnet electric machine has a hollow rotor provided in at least two pieces, such that it can be positioned around, and coupled to, an existing propulsion shaft of a marine vessel without demounting and/or disassembling the propulsion shaft. The permanent magnet electric machine also has a stator provided in at least two pieces, such that it can be positioned around the rotor without demounting and/or disassembling the propulsion shaft.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
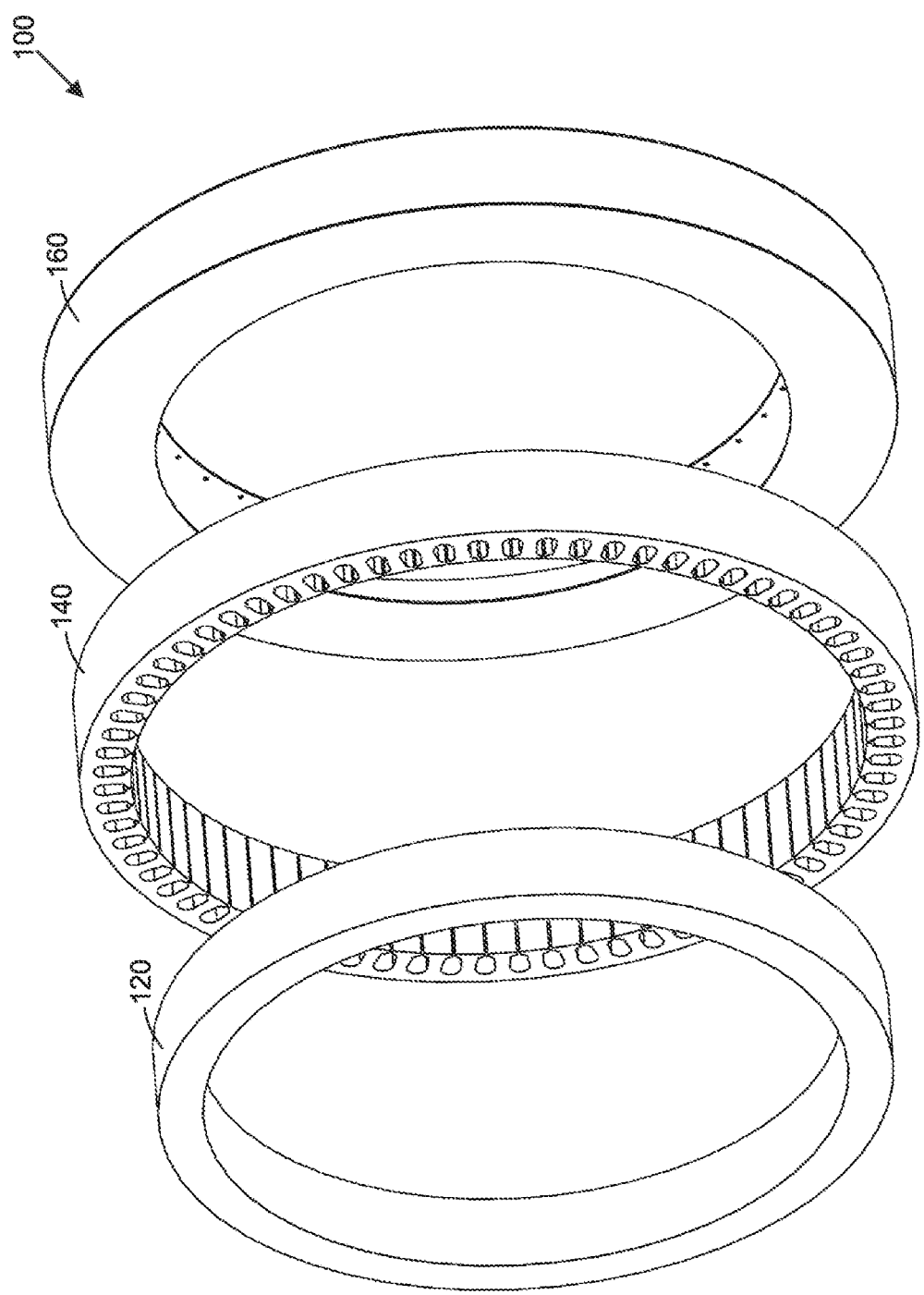
FIG. 1 is an exploded perspective schematic view of an electric machine, in accordance with one embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

While the apparatus and methods disclosed herein are described specifically in relation to and in use with marine vessels, it will be appreciated that the apparatus and methods may alternatively be used with other types of vehicles.

Figure 2:
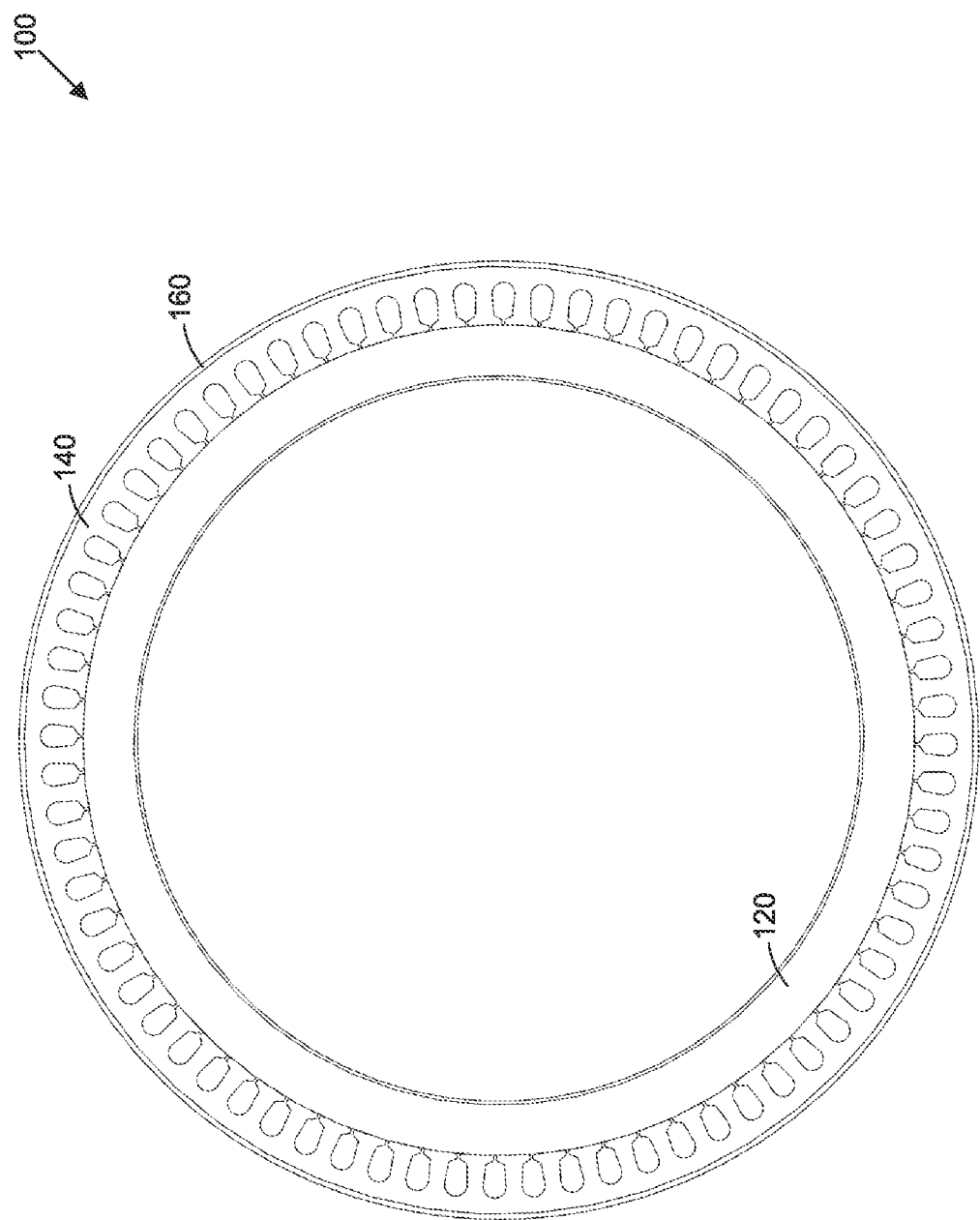
FIG. 2 is a cross section view of the electric machine of FIG. 1.

FIGS. 1 and 2 illustrate a schematic example of a permanent magnet electric machine, referred to generally as 100. The electric machine includes a stator 140 and a hollow rotor 120 positioned interior of the stator that can be driven by the stator. Electrical power may be supplied to one or more stator windings to induce rotation of the rotor relative to the stator.

Stator 140 includes a plurality of windings (not shown) that may be made of copper, copper alloys, or other suitable materials. Stator windings may be arranged in any suitable configuration. For example, the windings may be arranged as a set of poly-phase multi-polar stator windings. Stator windings may be connected in star or delta configuration.

Rotor 120 includes a plurality of magnets (not shown) such as neodymium (NdFeB) magnets. The rotor magnets may be arranged in any suitable configuration. For example, rotor magnets may be polarized in a Halbach configuration. Other configurations (e.g. parallel, radial) may be used in one or more alternative embodiments.

Power control electronics (not shown) for the electric machine may be provided in any suitable location. For example, power control electronics may be provided within stator enclosure 160.

Electric machine 100 preferably includes a stator enclosure 160, which may be alternatively characterized as a stator housing 160. In the illustrated example, stator enclosure 160 includes an annular casing positioned concentrically around stator 140.

FIGS. 3 to 7 illustrate a schematic example of a 'split' electric machine 100. In this example, two rotor segments 120a, 120b are provided that, when coupled together, form rotor 120. While two rotor segments are shown, it will be appreciated that three or more rotor segments may be provided in alternative embodiments.

By assembling rotor 120 from two or more rotor segments, rotor 120 may be positioned around an existing propulsion shaft 10 (e.g. a drive shaft of a marine vessel) without disassembling and/or demounting shaft 10.

Figure 3:
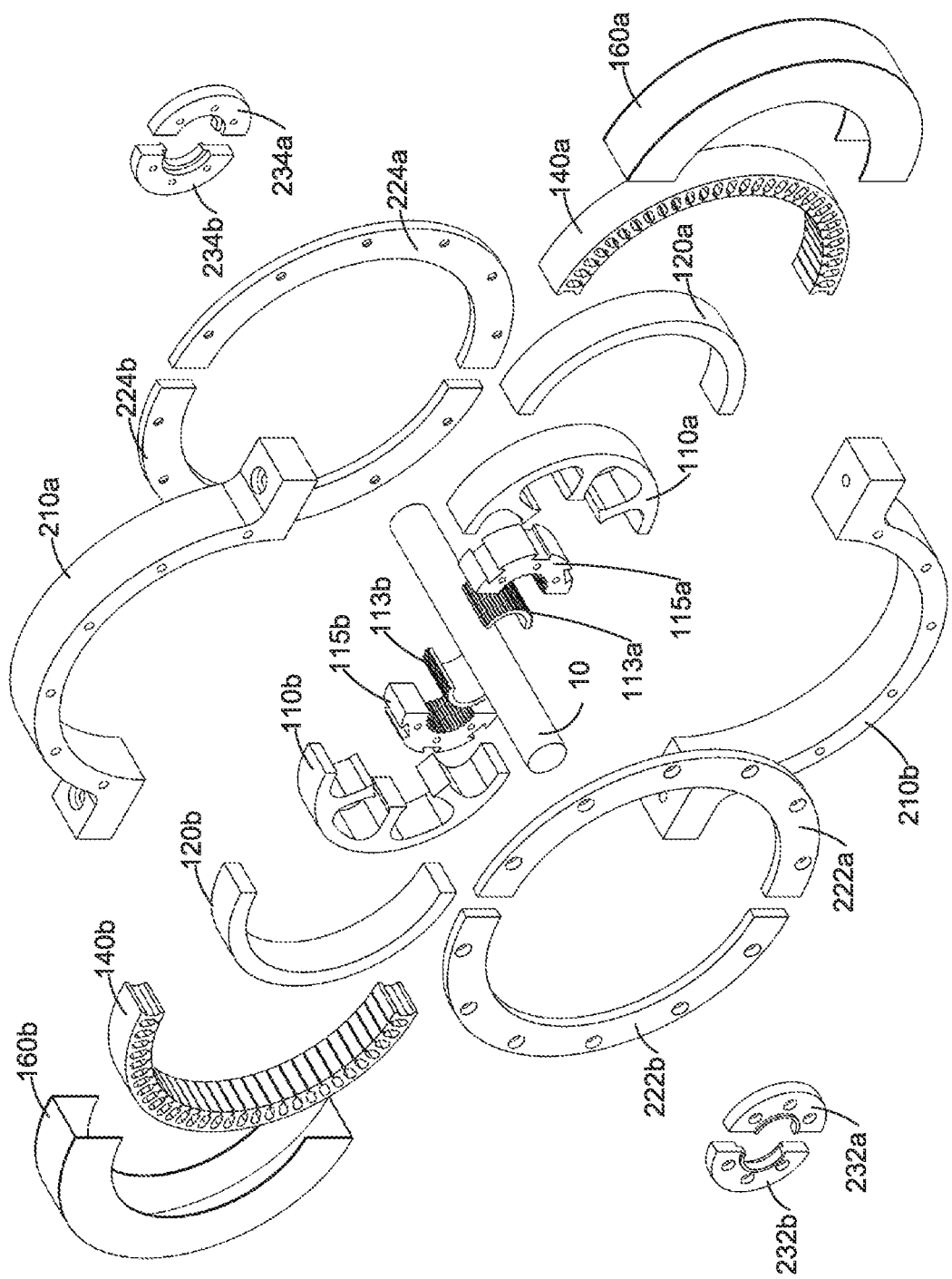
FIG. 3 is an perspective view of an electric machine coupled to an existing propulsion shaft via a motor mount, in accordance with one embodiment.
Figure 4:
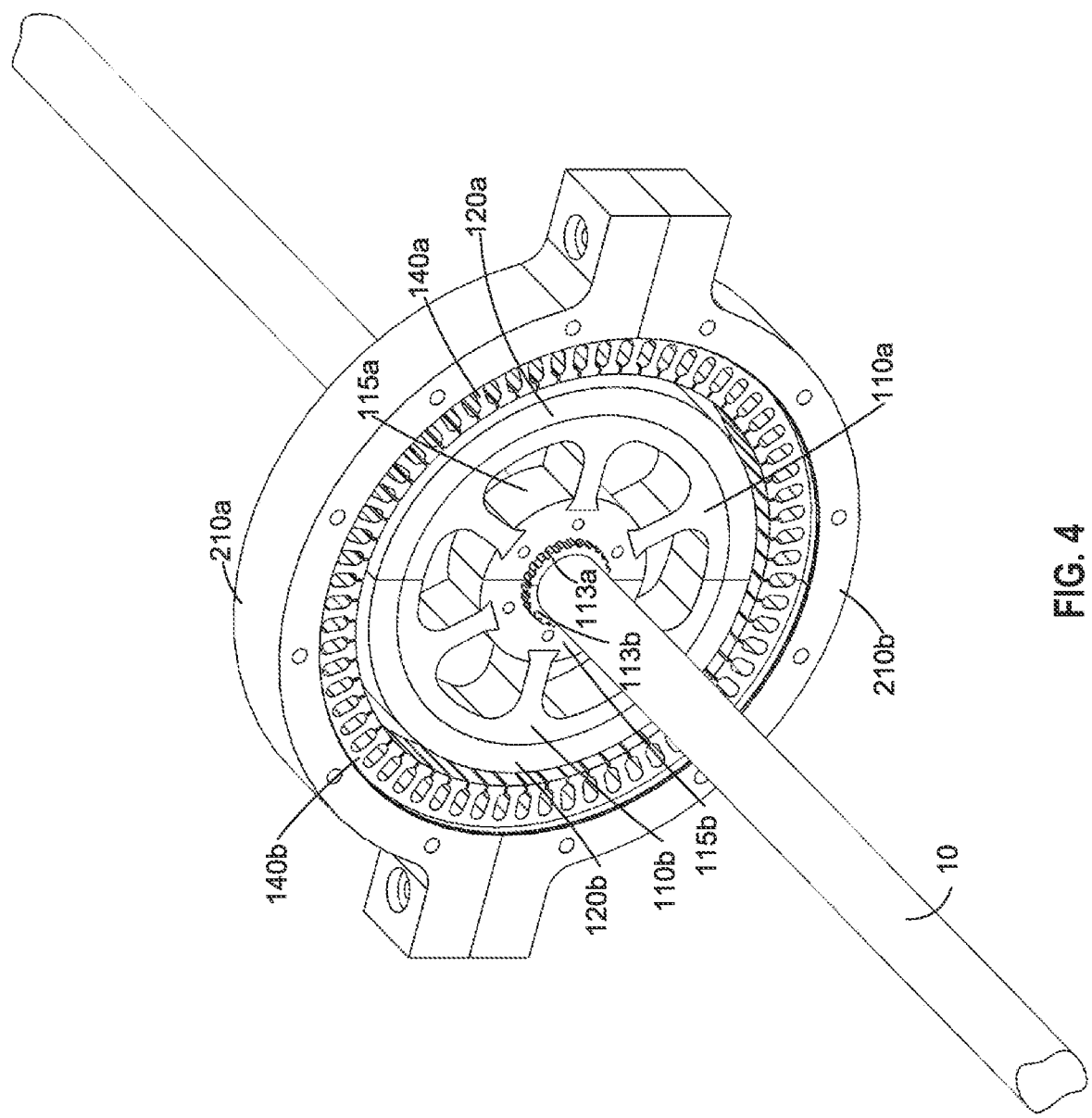
FIG. 4 is an isometric view of the rotor, stator, and motor mount of FIG. 3.
Figure 5:
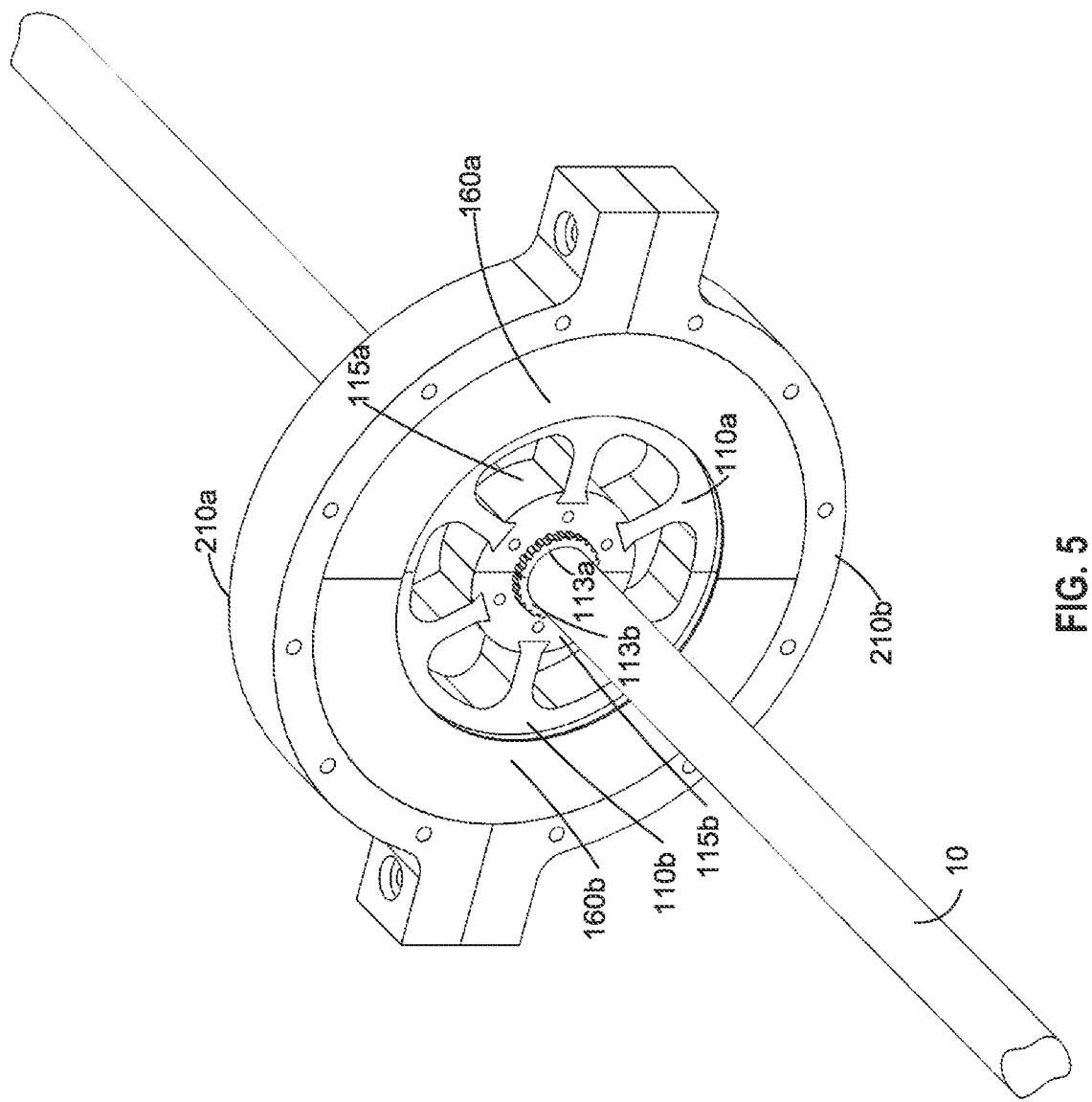
FIG. 5 is an isometric view of the rotor, stator, stator housing, and motor mount of FIG. 3.
Figure 6:
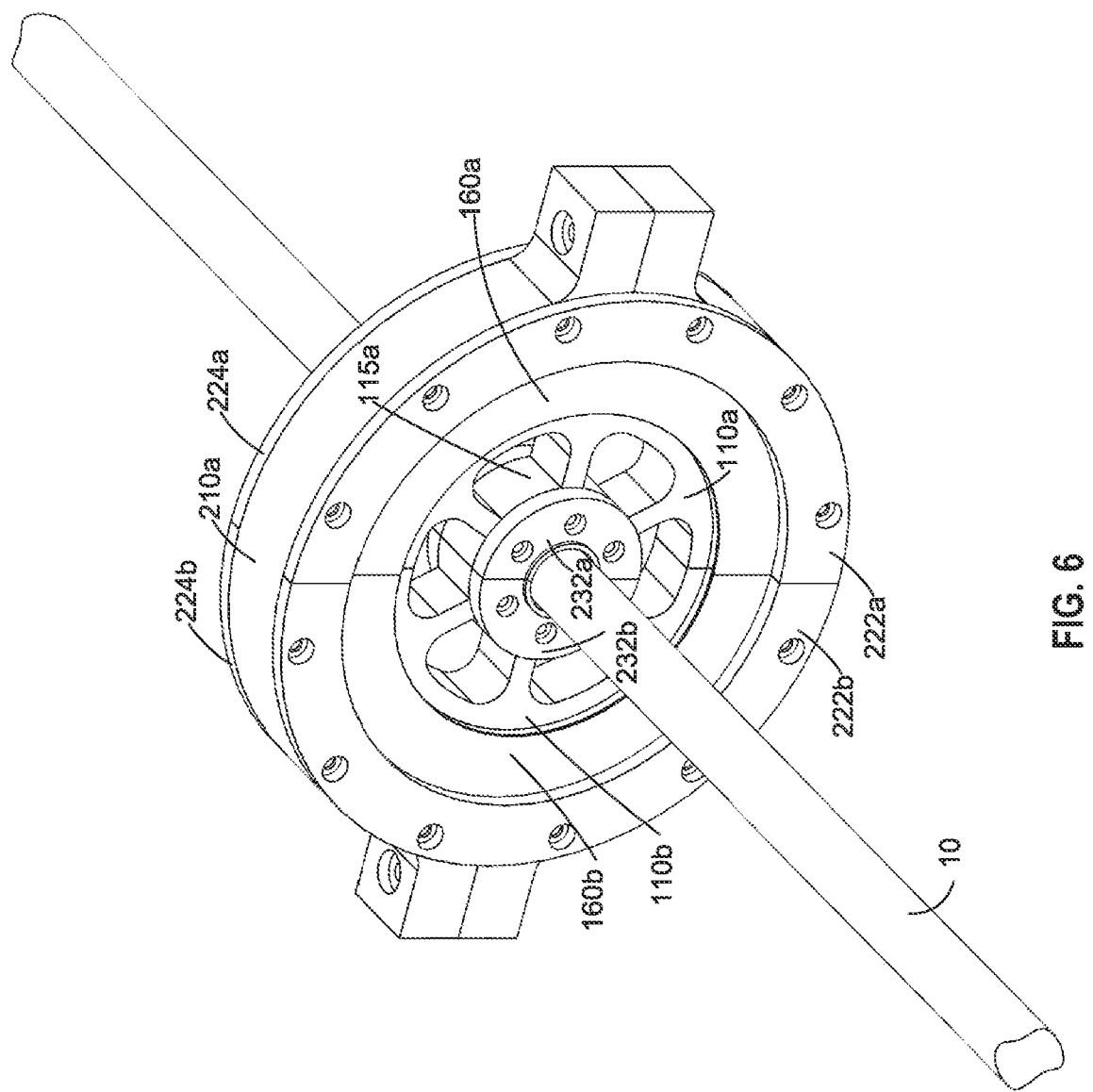
FIG. 6 is an isometric view of the rotor, stator, stator housing, motor mount, and retaining rings of FIG. 3.
Figure 7:
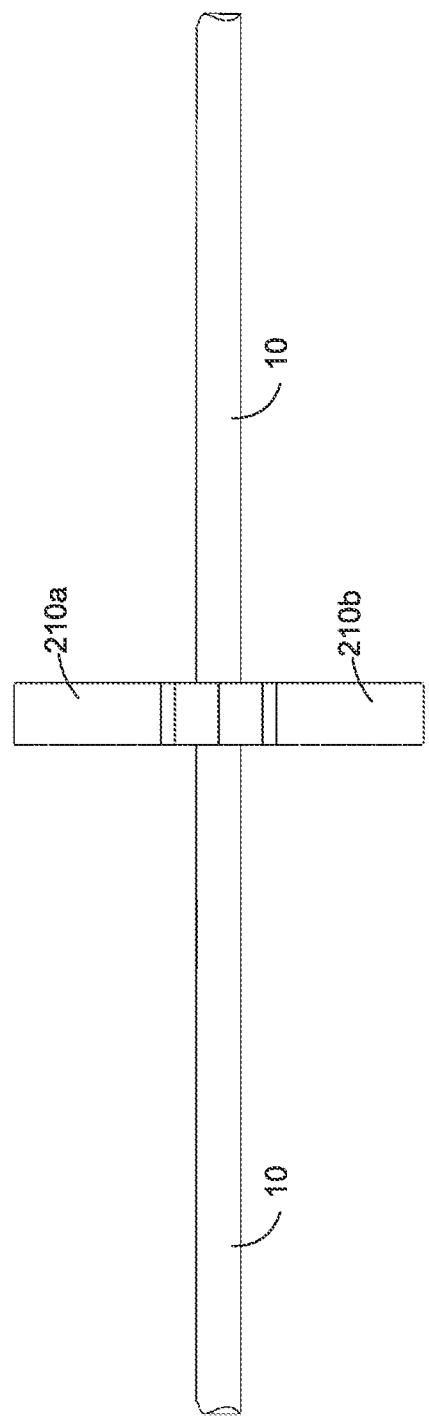
FIG. 7 is a side view of the rotor, stator, and motor mount of FIG. 4.
Figure 8:
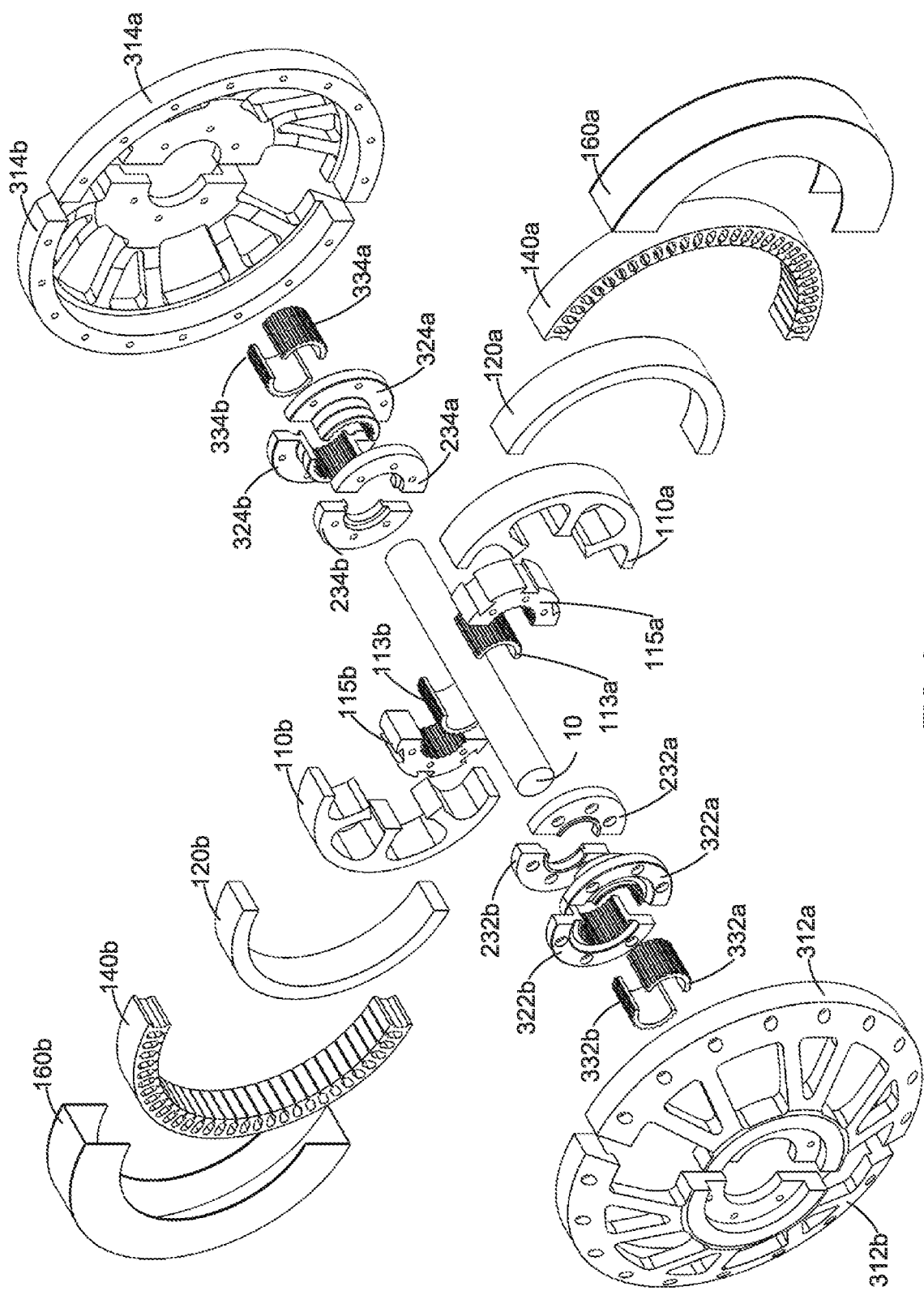
FIG. 8 is an exploded isometric view of an electric machine coupled to an existing propulsion shaft via a stator hub, in accordance with one embodiment.
Figure 9:
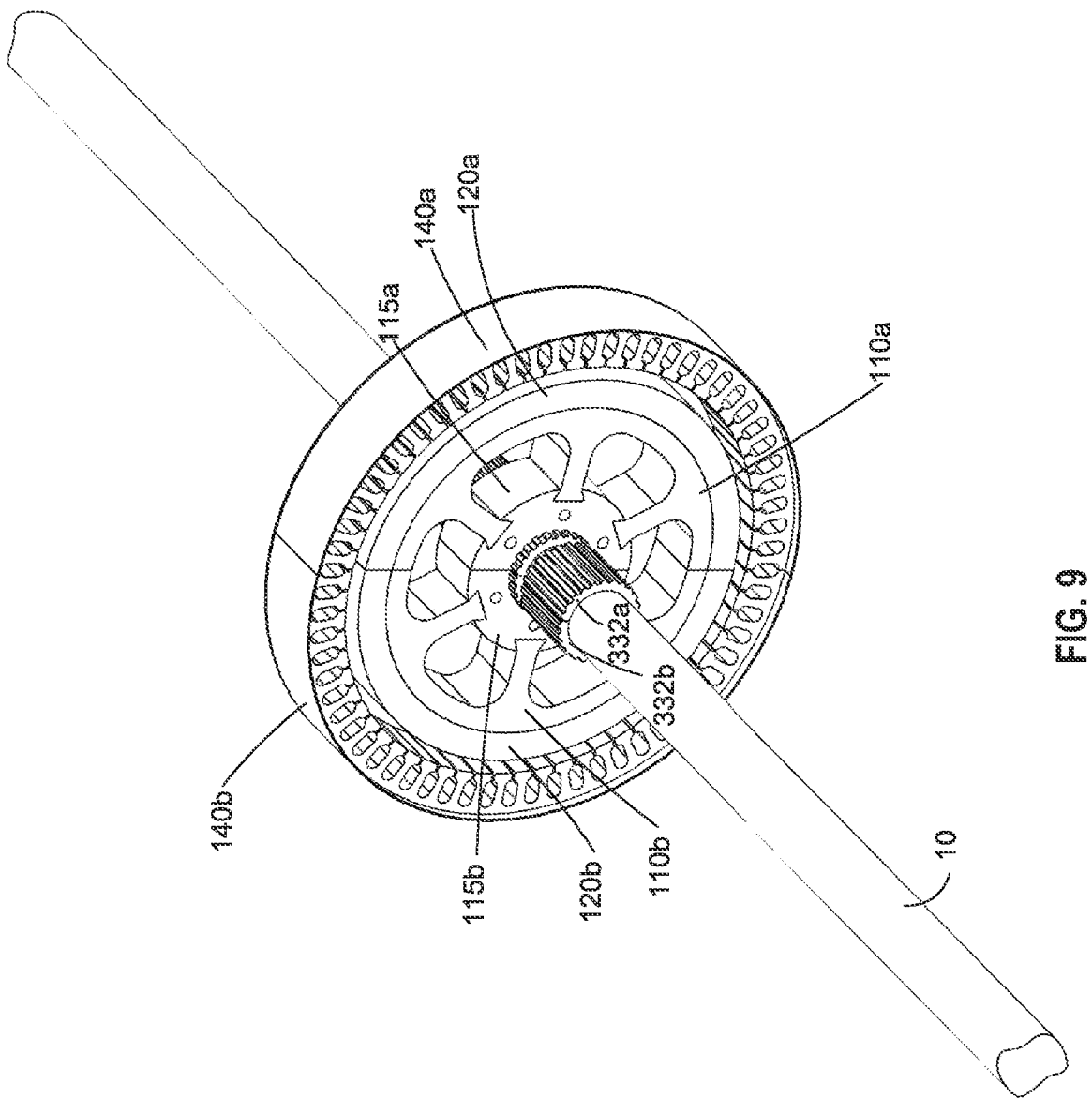
FIG. 9 is an isometric view of the rotor, stator, and shaft adaptors of FIG. 8.
Figure 10:
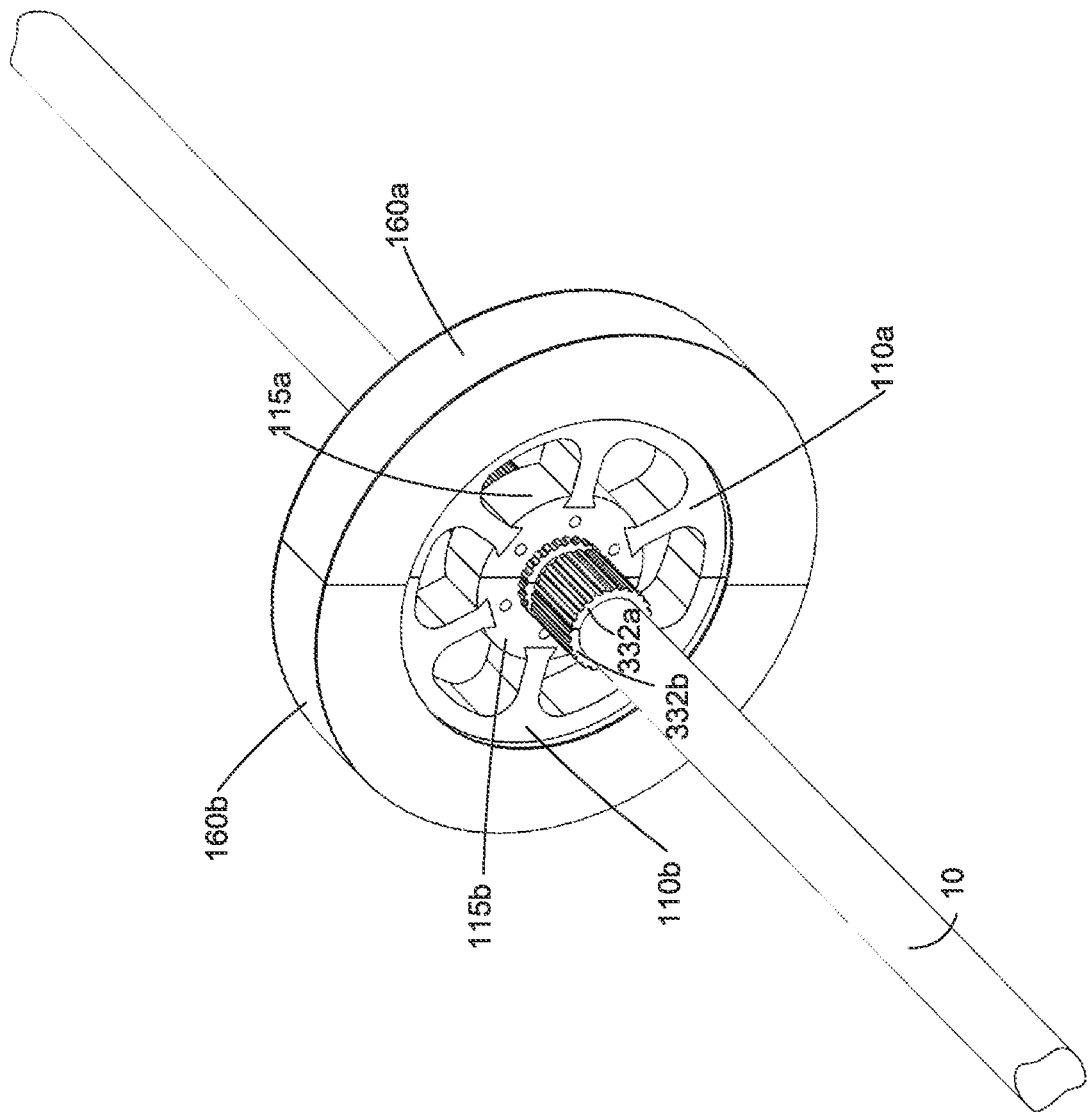
FIG. 10 is an isometric view of the rotor, stator, stator housing, and shaft adaptors of FIG. 8.
Figure 11:
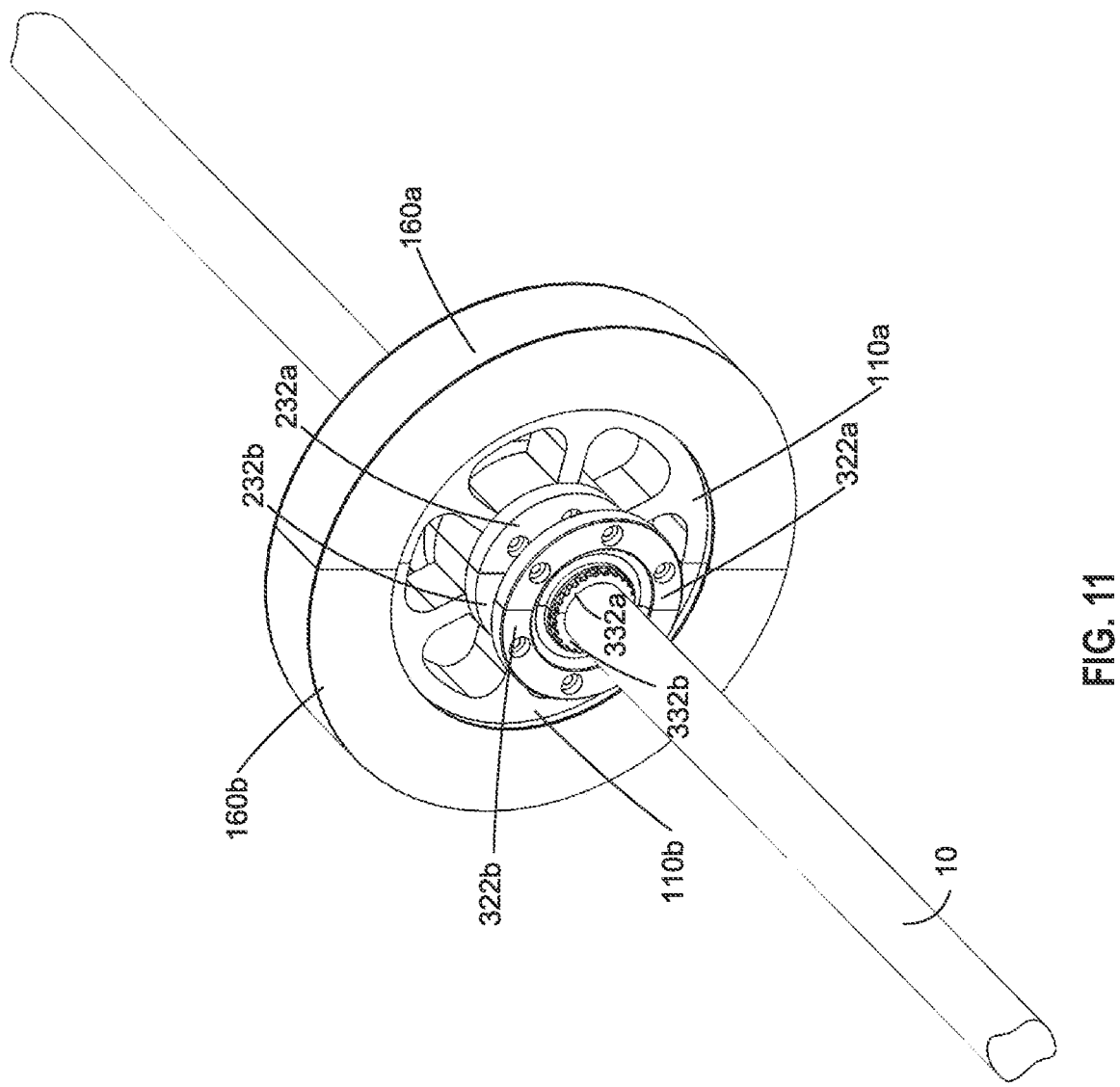
FIG. 11 is an isometric view of the rotor, stator, stator housing, and splined bearing of FIG. 8.
Figure 12:
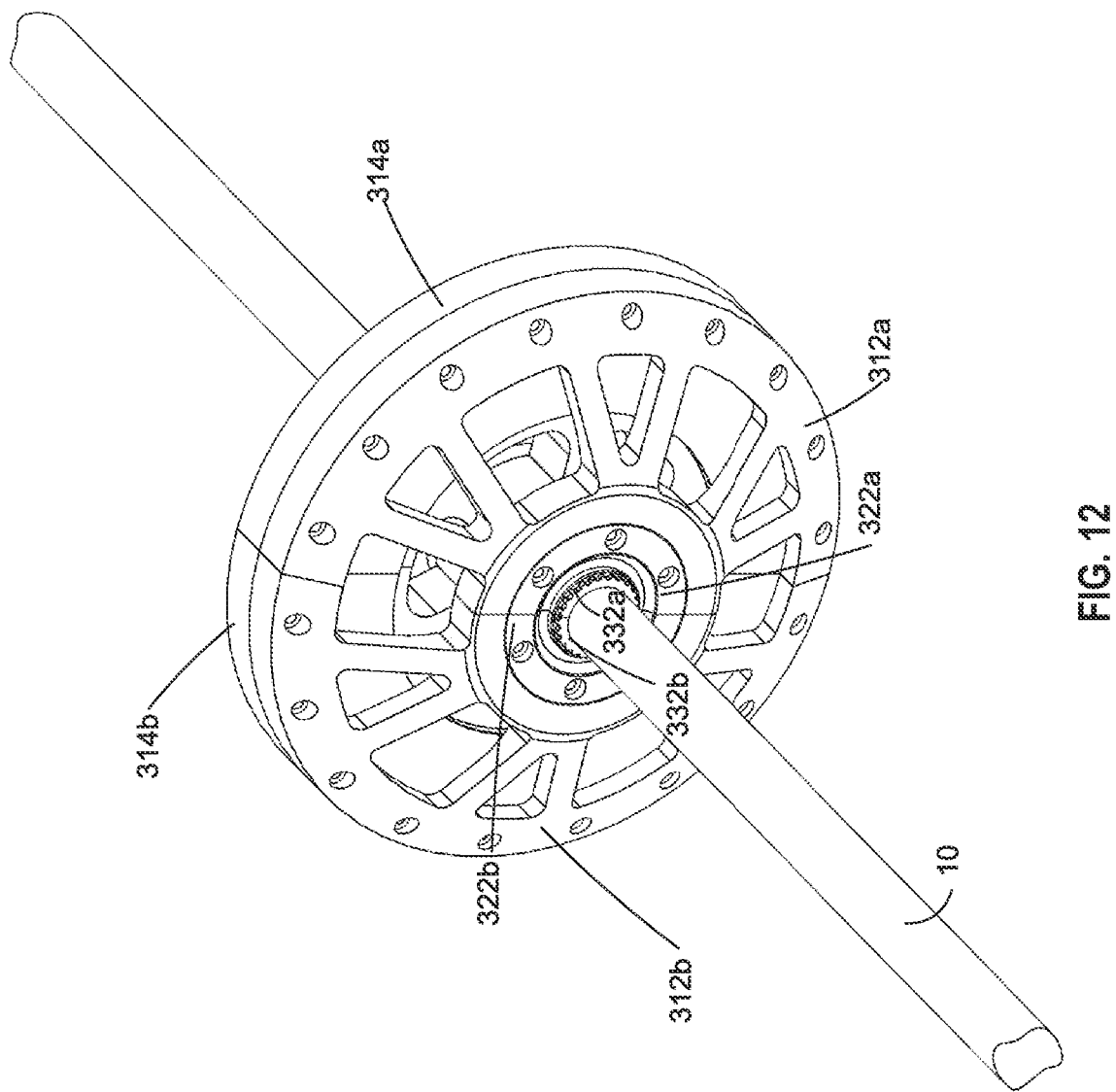
FIG. 12 is an isometric view of the electric machine of FIG. 8 coupled to an existing propulsion shaft.
Figure 13:
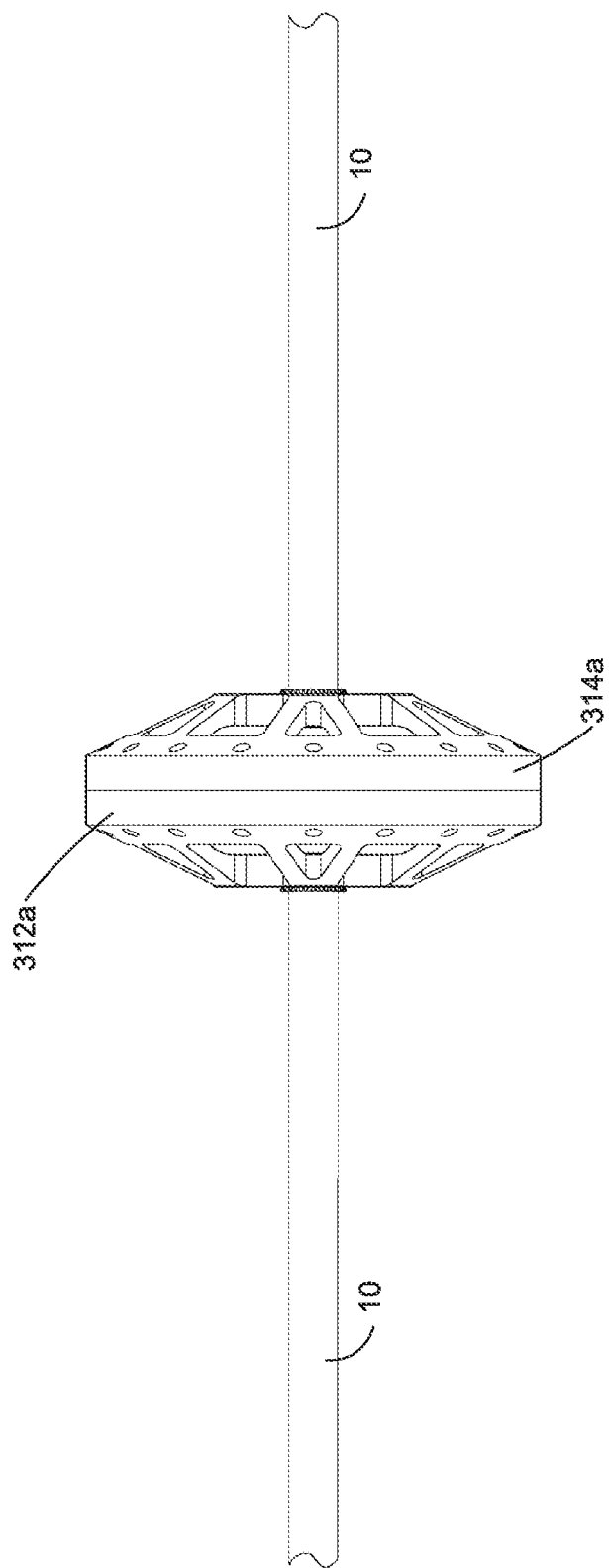
FIG. 13 is a side view of the electric machine of FIG. 12.

In the example illustrated in FIG. 3, two stator segments 140a, 140b are provided that, when coupled together, form stator 140. Also, two housing segments 160a, 160b are provided that, when coupled together, form housing 160. While two stator segments and two housing segments are shown, it will be appreciated that three or more stator and/or housing segments may be provided in alternative embodiments.

Also, in FIG. 3 the same number of rotor segments, stator segments, and housing segments are provided (i.e. two of each), it will be appreciated that this need not be the case. For example, four rotor segments may be provided to form rotor 120, and six stator segments may be provided to form stator 140.

To facilitate the 'splitting' of permanent magnet electric machine 100, stator 140 is preferably wound with multiple parallel paths to reduce, minimize, or avoid effects of unbalanced magnetic pull (UMP), such as vibration, acoustic noise, and deformation. Additionally, or alternatively, the stator windings may be configured to maintain symmetry during splitting.

In the illustrated example, rotor 120 is coupled to shaft 10 via a splined coupling. Specifically, a pair of externally splined shaft adaptors 113a, 113b are positioned around shaft 10, and may be secured to the shaft using any suitable method. A pair of internally splined shaft adaptors 115a, 115b are positioned around shaft adaptors 113a, 113b, and may be secured to the shaft using any suitable method, e.g. via split bearing retaining rings 232a, 232b and 234a, 234b. A two-piece rotor hub 110a, 110b is positioned around and engages shaft adaptors 115a, 115b. Rotor segments 120a, 120b are secured to rotor hub 110a, 110b.

Such an arrangement may have one or more advantages. For example, to accommodate shafts 10 with a range of possible diameters, some components (e.g. shaft adaptors 113, 115) may be fabricated to 'custom' dimensions for a specific vessel, while other components (e.g., electric machine 100, rotor hub 110) of a 'standard' size may be used with two or more sizes of shaft 10.

As illustrated, the center arms of rotor hub 110a, 110b may be slotted into groves in an outer surface of shaft adaptors 115a, 115b. This may allow transmission of rotational torque while also allowing some axial movement/play of the propulsion shaft 10.

In the illustrated example, a front retaining ring 222a, 222b and a rear retaining ring 224a, 224b are provided to axially secure and/or locate electric machine 100 to shaft 10.

In the example illustrated in FIGS. 3 to 7, stator 140 of electric machine 100 is secured to the vessel via an annular machine mount. In the illustrated example, a two-piece machine mount 210a, 210b is used to secure the stator of electric machine 100 to the vessel. While two machine mount segments are shown, it will be appreciated that three or more segments may be provided in alternative embodiments.

Preferably, a flexible connection is provided between the machine mount and the vessel's hull, in order to reduce and preferably minimize unbalanced reactional forces applied to the motor assembly while transmitting the opposing full rotor torque to the vessel hull (directly or indirectly).

FIGS. 3 to 7 illustrate another schematic example of a 'split' electric machine 100. In this example, the stator 140 is coupled to shaft 10 via a pair of two-piece stator hubs 312a, 312b and 314a, 314b. While a total of four stator hub segments are shown, it will be appreciated that five or more segments may be provided in alternative embodiments.

In the illustrated example, each stator hub 312, 314 is coupled to shaft 10 via a splined coupling and a bearing. Specifically, a pair of externally splined shaft adaptors 332a, 332b are positioned around shaft 10, and may be secured to the shaft using any suitable method. A pair of internally splined bearings 322a, 322b are positioned around shaft adaptors 332a, 332b, allowing each stator hub 312, 314 to rotate relative to shaft 10. The stator hubs 312, 314 may be coupled to each other directly, or indirectly (e.g. via stator housing 160) and secured to stator 140 using any suitable method.

Such an arrangement may have one or more advantages. For example, shaft 10 may bear some or all of the static weight of electric machine 100, which may provide increased flexibility for connecting stator hubs 312, 314 to an interior of the vessel. For example, such a connection may only need to resist torque generated by electric machine 100. Additionally, or alternatively, shaft bearings supporting the stator may be attached to the vessel's hull through one or more brackets (not shown) for providing additional support against a reaction torque.

As discussed above, the stator 140 and rotor 120 of electric machine 100 may be operated as an electric motor, where electrical power is applied to create mechanical torque on the rotor 120.

Alternatively, the stator and rotor of electric machine 100 may be operated as an electric generator. For example, stator 140 may be operated to generate resistance to the rotation of rotor 120. This may result in reduced net thrust provided by shaft 10, leading to a reduction in the vessel's speed. This may also result in the generation of electrical power, which may be used e.g. to supply energy to one or more systems or components (e.g. electrochemical batteries or other service loads) on board the vessel.

Figure 14:
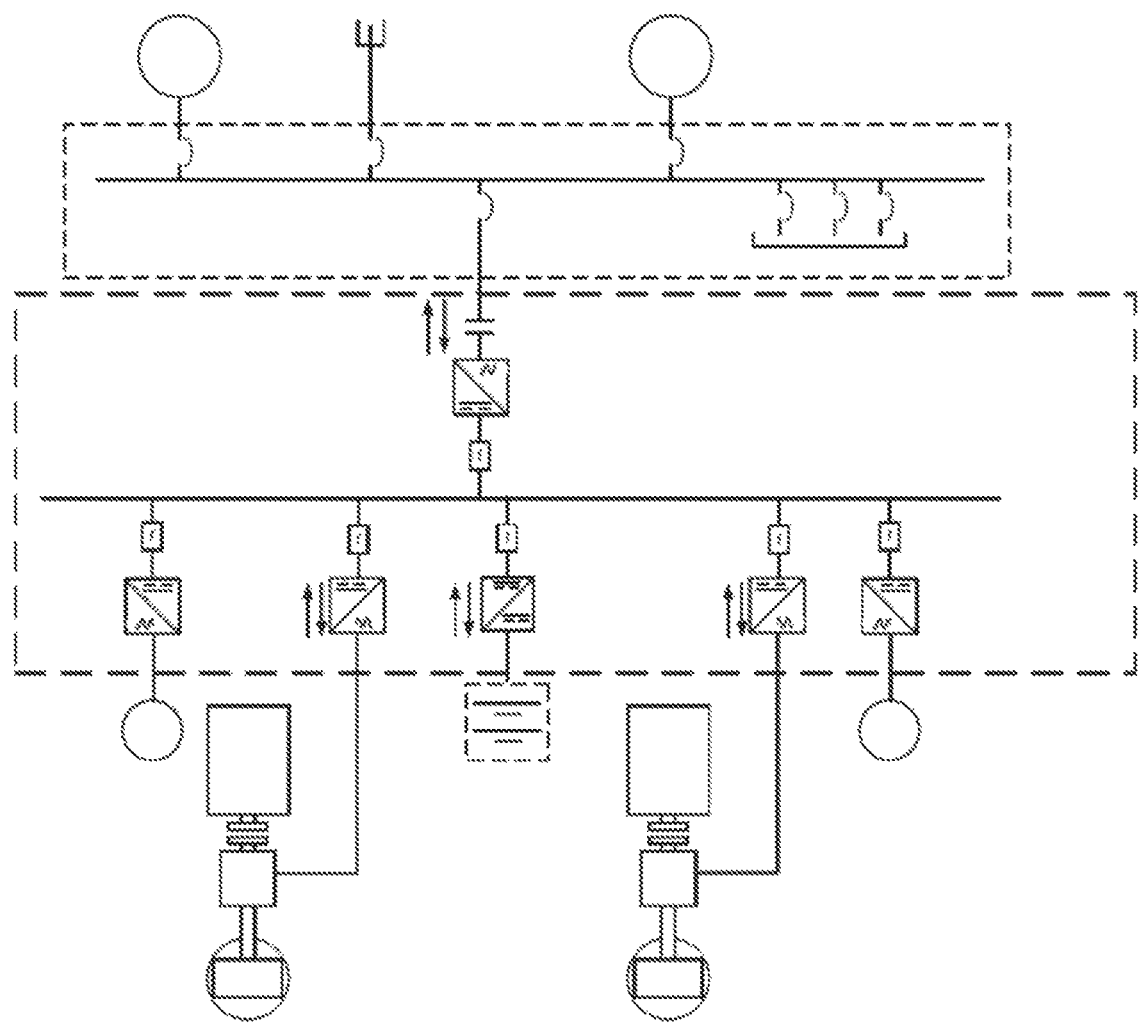
FIG. 14 is a schematic diagram of a hybrid propulsion system, in accordance with one embodiment.

FIG. 14 illustrates an example schematic configuration of a hybrid propulsion system. In the illustrated example, 75 kW split electric machines are positioned on drive shafts between 750 kW mechanical engines and thrusters for propelling the vessel. The 75 kW split electric machines can be split rotor or split stator permanent magnet motors able to be fitted to an existing shaft. The split electric machines are illustrated as being coupled to a switchboard, such as a direct current switchboard that may additionally be coupled to one or more pumps as well as a battery bank. Likewise, the DC switchboard as illustrated is coupled to an alternating current switchboard that itself may be coupled to one or more auxiliary generators, as additionally illustrated in FIG. 14.

As discussed above, a split design for the electric machine 100 can be fitted to existing propulsion shaft lines without the need to interrupt or modify the existing shaft. That is, typically to retrofit an electric motor to a vessel entails removal of a section of the existing shaft at a first location and a second location of the existing shaft 10, installation of an electric machine with its own shaft disposed therein in the region between the first location and the second location, and coupling the shaft of the installed electric machine to the existing shaft 10 at the first location and second location via couplings to match the circumference of the shaft of the installed electric machine to the existing shaft. This process is costly and time consuming, as it includes the removal of a portion of the shaft 10 itself. However, utilization of the electric machine 100 described herein allows for decreased installation time and/or costs for retrofitting existing vessels with hybrid power systems, as they are, for example, gearless (which can allow for direct connection to a propeller of the vessel via the existing shaft 10) and because they are installed and implemented in-line with the existing shaft 10.

Indeed, the electric machine 100 described herein may be modular and/or scalable to facilitate its installation in a wide variety of vessel types and can be disposed about existing propulsion shafts 10 having various circumferences. As described above, one technique to allow for the split electric machine to be coupled to a shaft includes the use of shaft adapters. However, additional techniques are envisioned to allow for a split electric machine to be coupled to various sided shafts 10.

Figure 15:
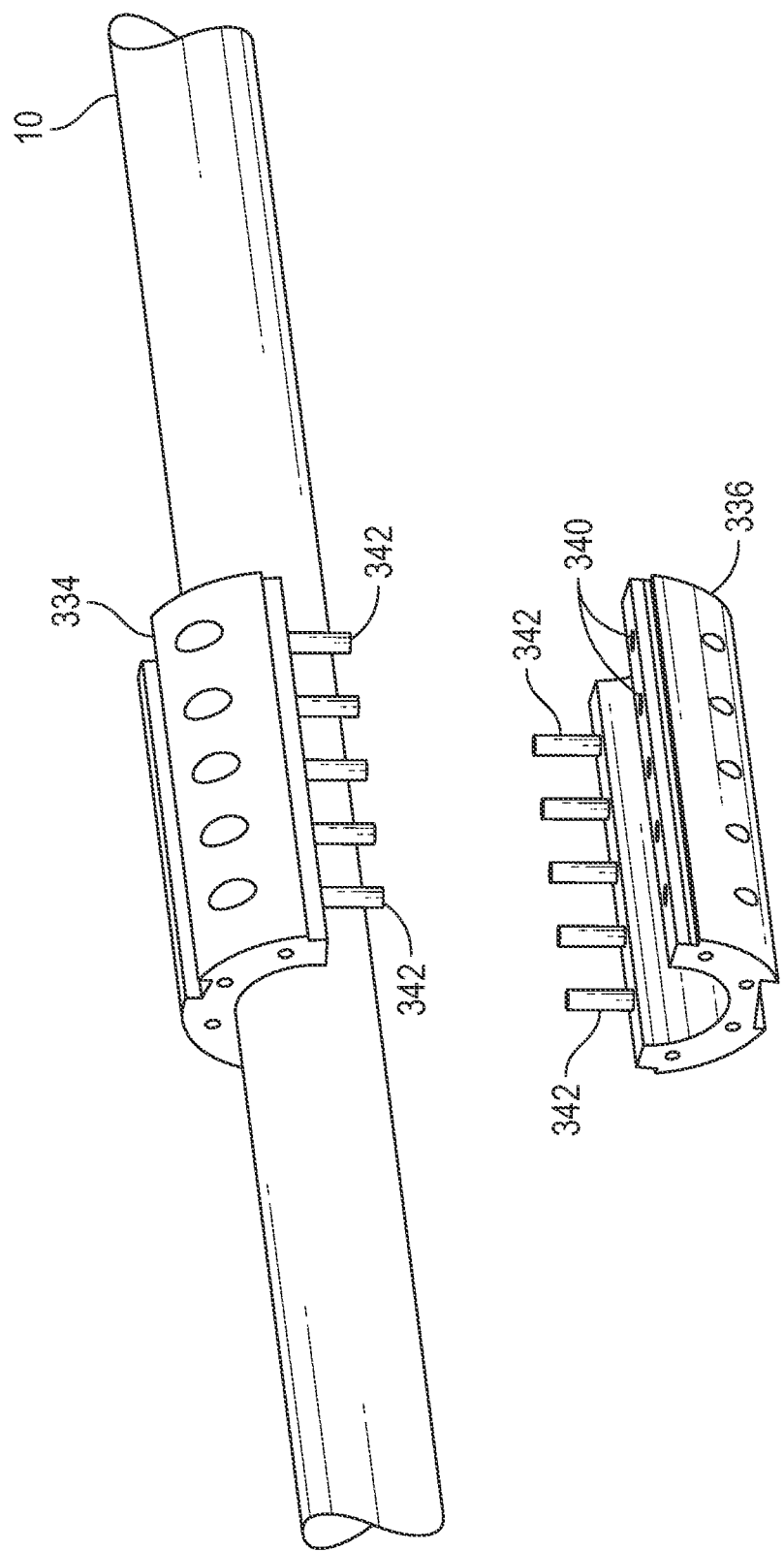
FIG. 15 is a view of rotor shaft collar segments about a shaft, in accordance with an embodiment.
Figure 16:
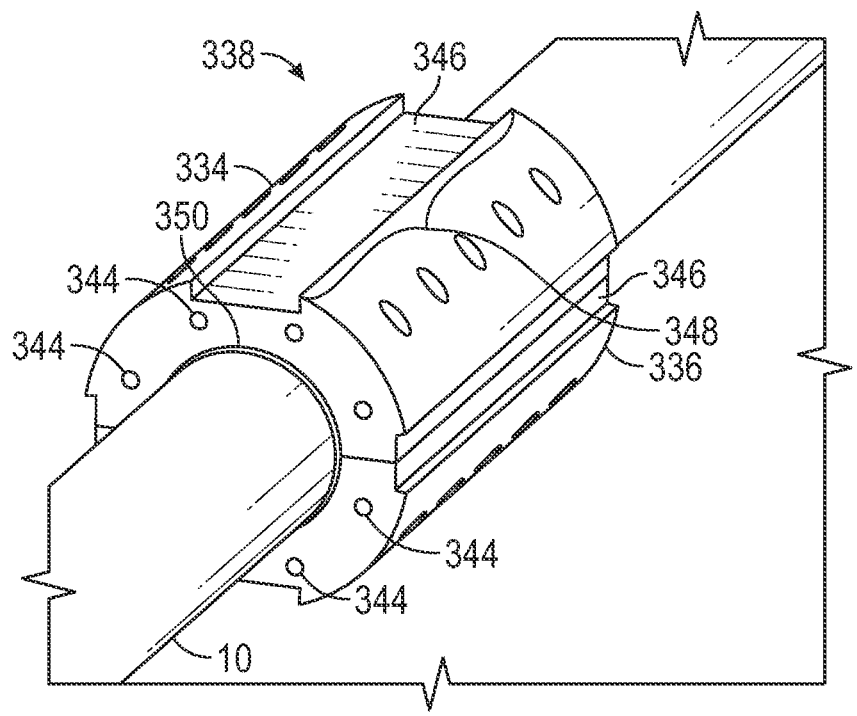
FIG. 16 is a view of the rotor shaft collar segments of FIG. 15 as a rotor shaft collar, in accordance with an embodiment.

FIG. 15 illustrates rotor shaft collar segment 334 and rotor shaft collar segment 336 that can be directly coupled to one another about the shaft 10 to form the rotor shaft collar 338 of FIG. 16. As illustrated, the rotor shaft collar segment 334 and the rotor shaft collar segment 336 include a plurality of apertures 340 that align with guides 342 (e.g., pins or hollow members that accept fasteners such as bolts, screws, pins, and the like) from the corresponding rotor shaft collar segment 334 and the rotor shaft collar segment 336 so that apertures 340 and the guides 342 mate when the rotor shaft collar segment 334 and the rotor shaft collar segment 336 are brought into contact with one another to form the rotor shaft collar 338 of FIG. 16. It should be noted that other configurations for the rotor shaft collar 338 are envisioned, for example, having split flanges with through rods therethrough.

As illustrated in FIG. 16, the rotor shaft collar 338 circumferentially surrounds the shaft 10. The rotor shaft collar 338 of FIG. 16 can also include one or more apertures 344 that can operate to accept fasteners, such as bolts, screws, pins, and the like. In some embodiments, the apertures 344 may be equally spaced along a face of the rotor shaft collar 338. Likewise, the rotor shaft collar 338 may have a generally cylindrical shape. However, in some embodiments, the outer portion of the rotor shaft collar 338 may include one or more alignment features 346 disposed about the outer portion of the rotor shaft collar 338, for example, along the length 348 of the rotor shaft collar 338. For example, the one or more alignment features 346 may be a groove or channel that can accept an alignment feature (e.g., a protrusion or projection) of a rotor segment disposed about the rotor shaft collar 338.

In some embodiments, the rotor shaft collar 338 may have an inner circumference 350 that is sized to directly couple the rotor shaft collar 338 to the shaft 10. This inner circumference 350 can be increased or decreased based on (i.e., to match) the circumference of the shaft 10. Thus, in some embodiments where the shaft 10 has a first diameter and/or circumference, the inner circumference 350 of the rotor shaft collar 338 is machined to correspond to (e.g., match) the first circumference and/or diameter of the shaft 10. Likewise, in other embodiments where the shaft 10 has a second circumference/diameter greater in size relative to the first circumference/diameter, the inner circumference 350 (and/the diameter) of the rotor shaft collar 338 is machined to correspond to (e.g., match) the second circumference/diameter of the shaft 10. This allows the rotor shaft collar 338 to operate a spacer for a rotor assembly, so as to allow the rotor assembly to be mounted to shafts 10 each having a respective circumference to facilitate the electric machine 100 being scalable to facilitate its installation in a wide variety of vessel types having existing propulsion shafts 10 having various circumferences. This arrangement also has advantages in that to accommodate shafts 10 with a range of possible diameters and circumferences, some components (e.g. rotor shaft collar 338) may be fabricated to 'custom' dimensions for a specific vessel, while other components (e.g., the rotor, stator, housing, etc.) may be of a 'standard' size that may be used with two or more sizes of shaft 10.

In other embodiments, one or more shims or other spacers (e.g., a hollow cylinder shaped spacer) can be generated from two (or more) shim segments coupled together. The one or more shims can be placed in direct contact with the inner circumference 350 of the rotor shaft collar segment 334 and the rotor shaft collar segment 336 and the one or more shims can also directly contact the shaft. This allows for the rotor shaft collar 338 to match a smaller diameter shaft 10 when the rotor shaft collar 338 is machined to a fixed inner diameter that is greater than the diameter of the shaft 10 (thus providing a rotor shaft collar 338 with a fixed inner diameter or inner circumference 350 to be matched to shafts 10 of various circumferences/diameters).

Figure 17:
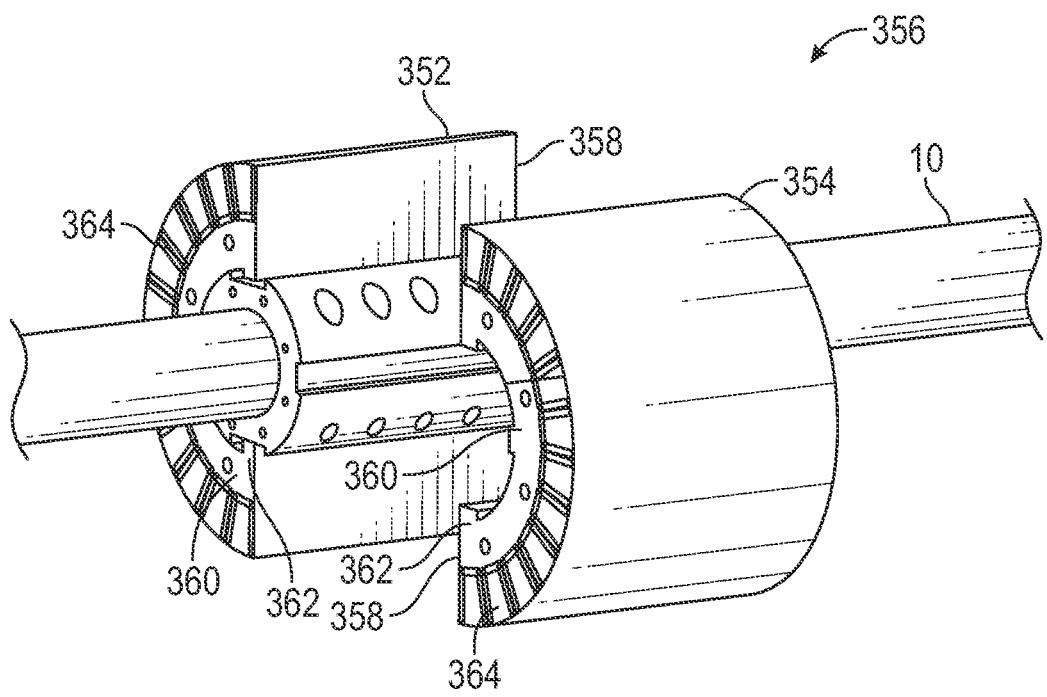
FIG. 17 is a view of rotor segments about the rotor shaft collar of FIG. 16, in accordance with an embodiment.
Figure 18:
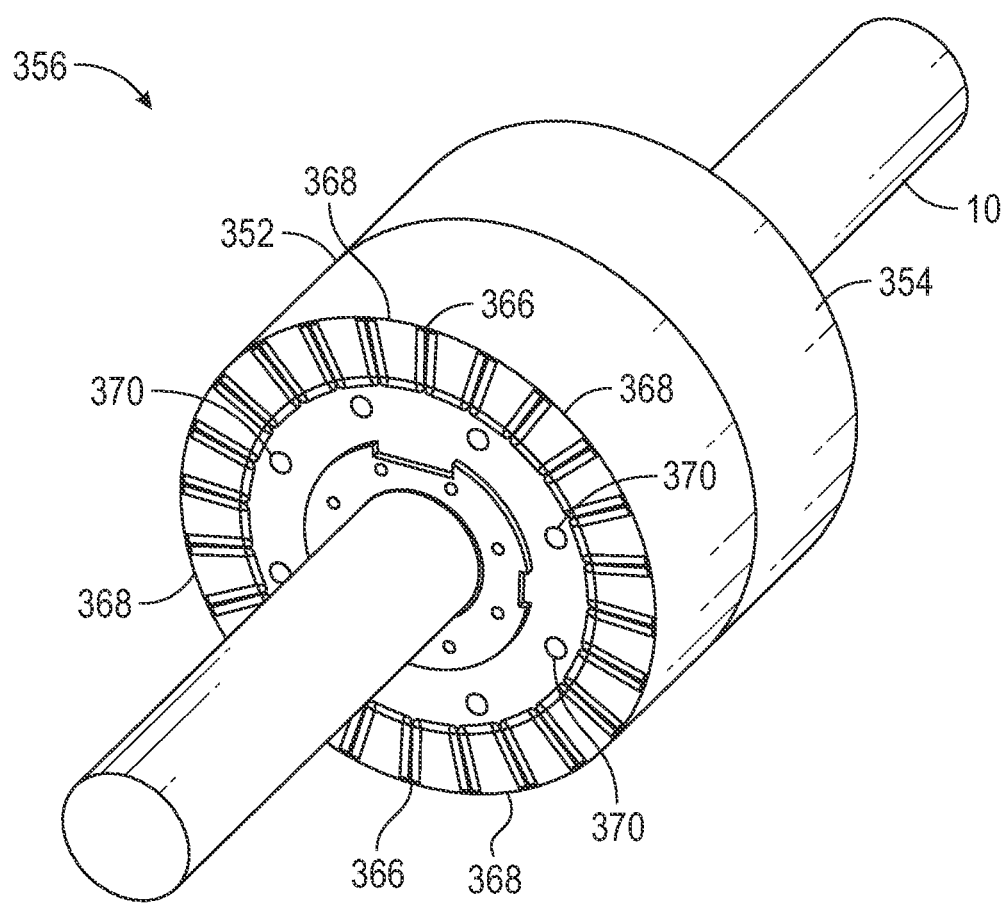
FIG. 18 is a view of the rotor segments of FIG. 16 as a rotor, in accordance with an embodiment.

FIG. 17 illustrates rotor segment 352 and rotor segment 354 that can be coupled to one another about the shaft 10 to form the rotor 356 of FIG. 18. As illustrated, the rotor segment 352 and the rotor segment 354 each include an inner face 358 that directly contacts one another to form the rotor 356. The rotor segment 352 and the rotor segment 354 each also include a rotor hub 360 that directly contacts and circumferentially surrounds the rotor shaft collar 338. The rotor 356 further includes a plurality of magnets 364, such as neodymium (NdFeB) magnets. The plurality of magnets 364 may be circumferentially disposed about the rotor hub 360 on each of the rotor segment 352 and the rotor segment 354 so that when the rotor segment 352 and the rotor segment 354 are directly coupled to form the rotor 356, at least one magnet of the plurality of magnets 364 of the rotor segment 352 is disposed adjacent to at least one magnet of the plurality of magnets 364 of the rotor segment 354 to form a group of two magnets 366 that matches other groups of two magnets 368 of each of the rotor segment 352 and the rotor segment 354. In this manner, similar to described above with respect to FIG. 3, the plurality of magnets 364 are disposed at a common distance from one another regardless of whether any two adjacent magnets are each in the rotor segment 352, are each in the rotor segment 354, or when one adjacent magnet is in the rotor segment 352 and the second adjacent magnet is in the rotor segment 354. Thus, the rotor segment 352 and the rotor segment 354 combine to form a unitary rotor as the rotor 356 (e.g., a rotor 356 without intra-segment gaps).

The plurality of magnets 364 may be arranged in a number of orientations, for example, a flat web orientation, a flat simple orientation, a U-shaped orientation, a spoke magnet orientation, a V web orientation, a V simple orientation, or other orientations, which may be selected to tune torque or other performance characteristics of the electric machine 100. In some embodiments, as rotor 356 rotates, the plurality of magnets 364 are retained in the lamination surrounding each magnet with the help of the lamination bridges, which may be designed so that the maximum stresses levels have been reduced to less than a determined value, such as 180 Megapascals.

Figure 19:
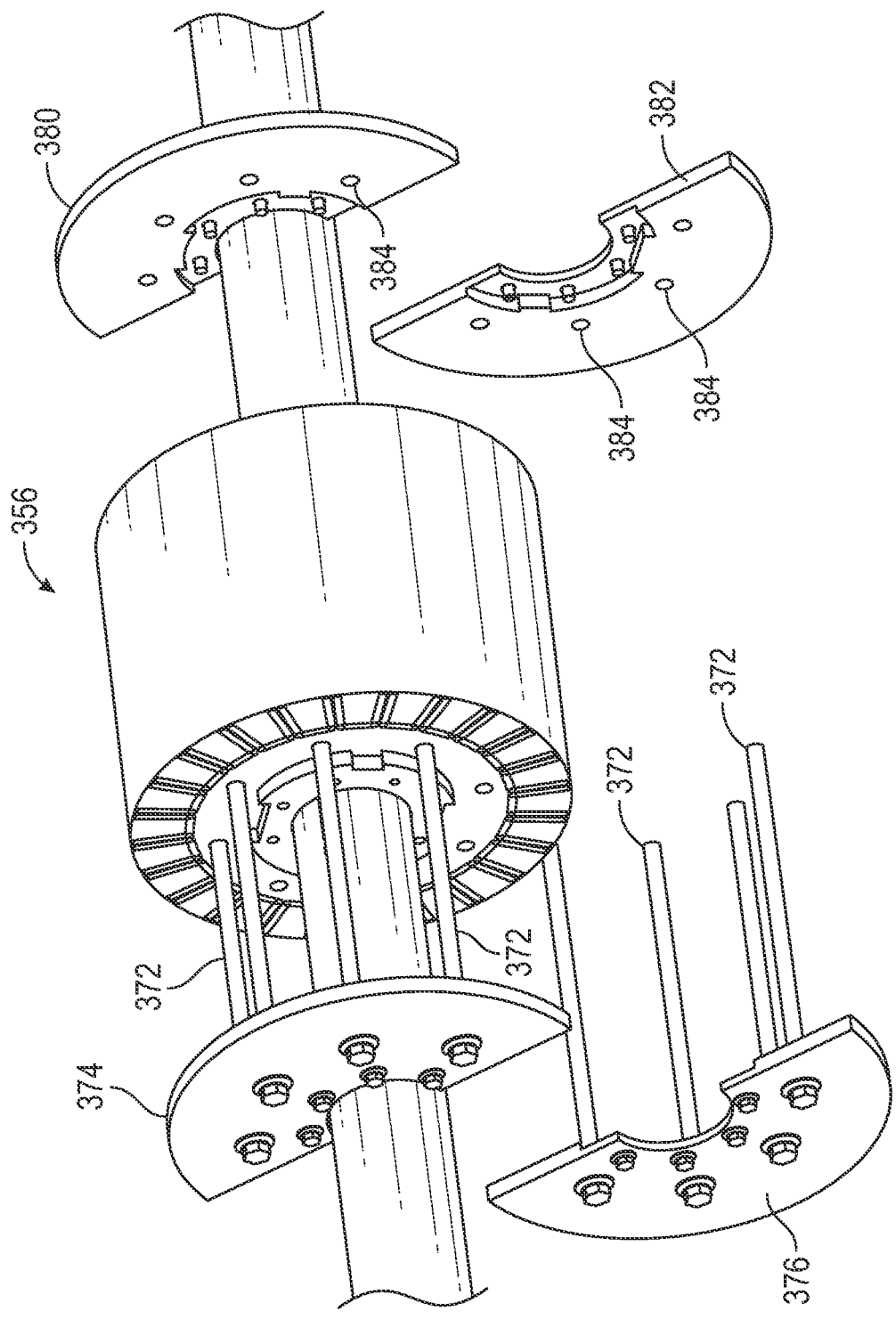
FIG. 19 is a view of end plates of the rotor of FIG. 18, in accordance with an embodiment.
Figure 20:
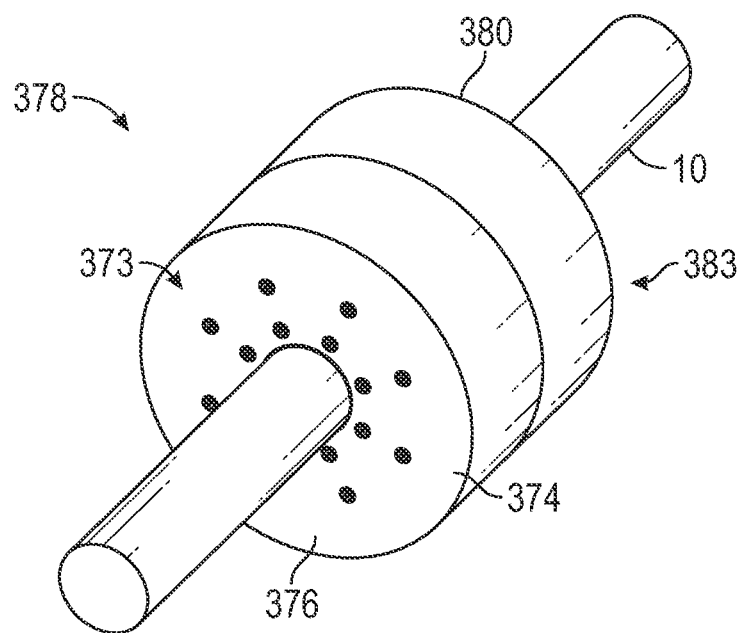
FIG. 20 is a view of a rotor assembly, in accordance with an embodiment.

As additionally illustrated in FIG. 18, the rotor 356 may include a plurality of apertures 370. These apertures 370 align with guides 372 (e.g., pins or hollow members that accept fasteners such as bolts, screws, pins, and the like) from end plate segment 374 and end plate segment 376 of FIG. 19 so that apertures 370 and the guides 372 mate when end plate segment 374 and end plate segment 376 are brought into contact with rotor segment 352 and rotor segment 354 to form the rotor assembly 378 of FIG. 20. Also illustrated are end plate segment 380 and end plate segment 382 which correspond to end plate segment 374 and end plate segment 376. End plate segment 380 and end plate segment 382 include apertures 384 to receive the guides 372. When the rotor segment 352 and the rotor segment 354 are coupled to the end plate segment 374 and end plate segment 376, the end plate segment 374 and end plate segment 376 form a face 373 of the rotor assembly 378. Likewise, when the rotor segment 352 and the rotor segment 354 are coupled to the end plate segment 380 and end plate segment 382, the end plate segment 380 and end plate segment 382 form a face 383 of the rotor assembly 378 of the electric machine 100.

Figure 21:
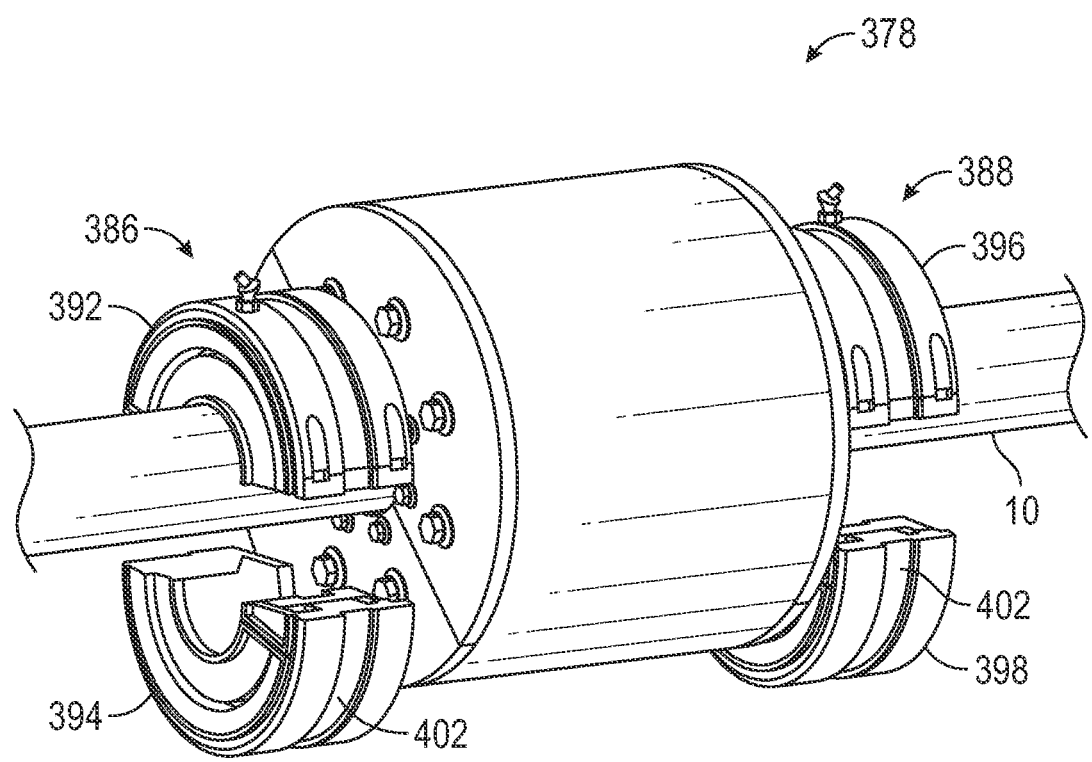
FIG. 21 is a view of bearings in conjunction with the rotor assembly of FIG. 20, in accordance with an embodiment.
Figure 22:
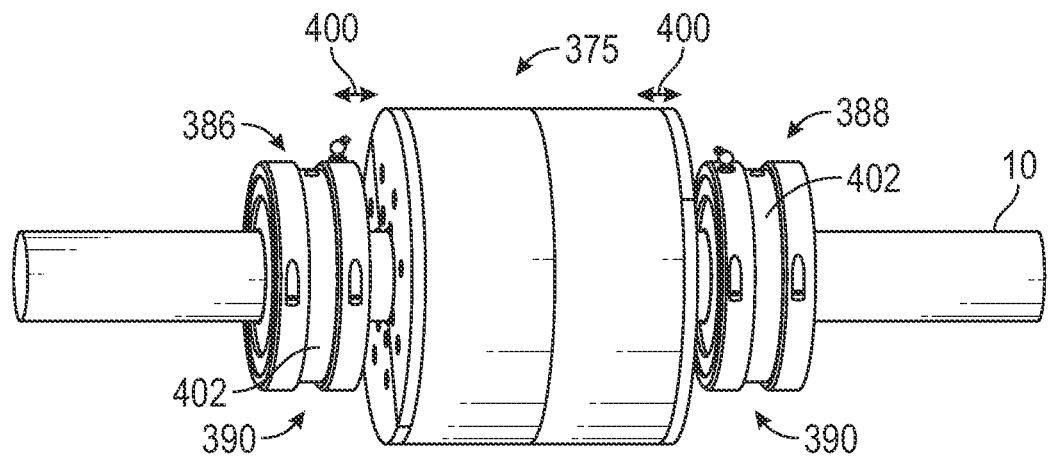
FIG. 22 is a view of the bearings of FIG. 21 as a bearing assembly, in accordance with an embodiment.

Additionally, a bearing 386 and a bearing 388, as illustrated in FIG. 21, which combine into a bearing assembly 390 of FIG. 22, can be utilized in conjunction with the electric machine 100. The bearing 386 may be made up of a bearing segment 392 and a bearing segment 394 that may be affixed to one another via one or more fasteners, such as bolts, screws, pins, and the like. Similarly, the bearing 388 may be made up of a bearing segment 396 and a bearing segment 398 that may be affixed to one another via one or more fasteners, such as bolts, screws, pins, and the like.

The bearing 386 and the bearing 388, when assembled about the shaft 10, may be disposed at a distance 400 along the shaft 10 from the rotor assembly 378 of the electric machine 100, as illustrated in FIG. 22. This distance 400 may be chosen based upon the size of the housing and/or fluid jacket of the electric machine. In some embodiments, the bearing 386 and the bearing 388 include ceramic rollers to isolate bearing currents. Additionally, the bearing 386 and the bearing 388 can each include an alignment feature 402 disposed about the outer portion of the bearing 386 and the bearing 388, for example, circumferentially about the bearing 386 and the bearing 388. The alignment feature 402 may be a groove or channel that can accept an end plate of the housing of the electric machine 100.

Figure 23:
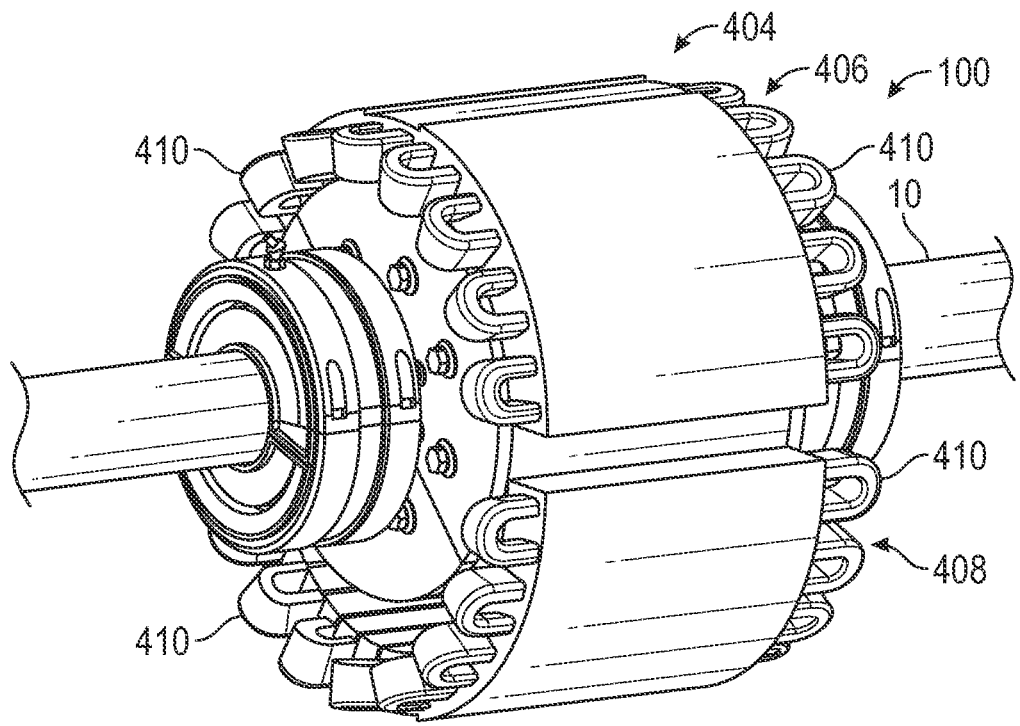
FIG. 23 is a view of a stator in conjunction with the rotor assembly of FIG. 20, in accordance with an embodiment.

FIG. 23 illustrates stator 404 as made up of stator segments 406 and 408 that, when directly coupled together, form stator 404. Taken in conjunction, the stator 404 and the rotor assembly 378 form the electric machine 100. Stator 404 is similar to stator 140 described above and stator 404 includes a plurality of windings 410 that may be made of copper, copper alloys, or other suitable materials. Stator windings 410 may be arranged in any suitable configuration. For example, the stator windings 410 may be arranged as a set of poly-phase multi-polar stator windings. Stator windings 410 may be connected in star or delta configuration). In some embodiments, the stator segments stator segments 406 and 408 when joined create a balanced polyphase source (i.e., a balanced polyphaser system).

Figure 24:
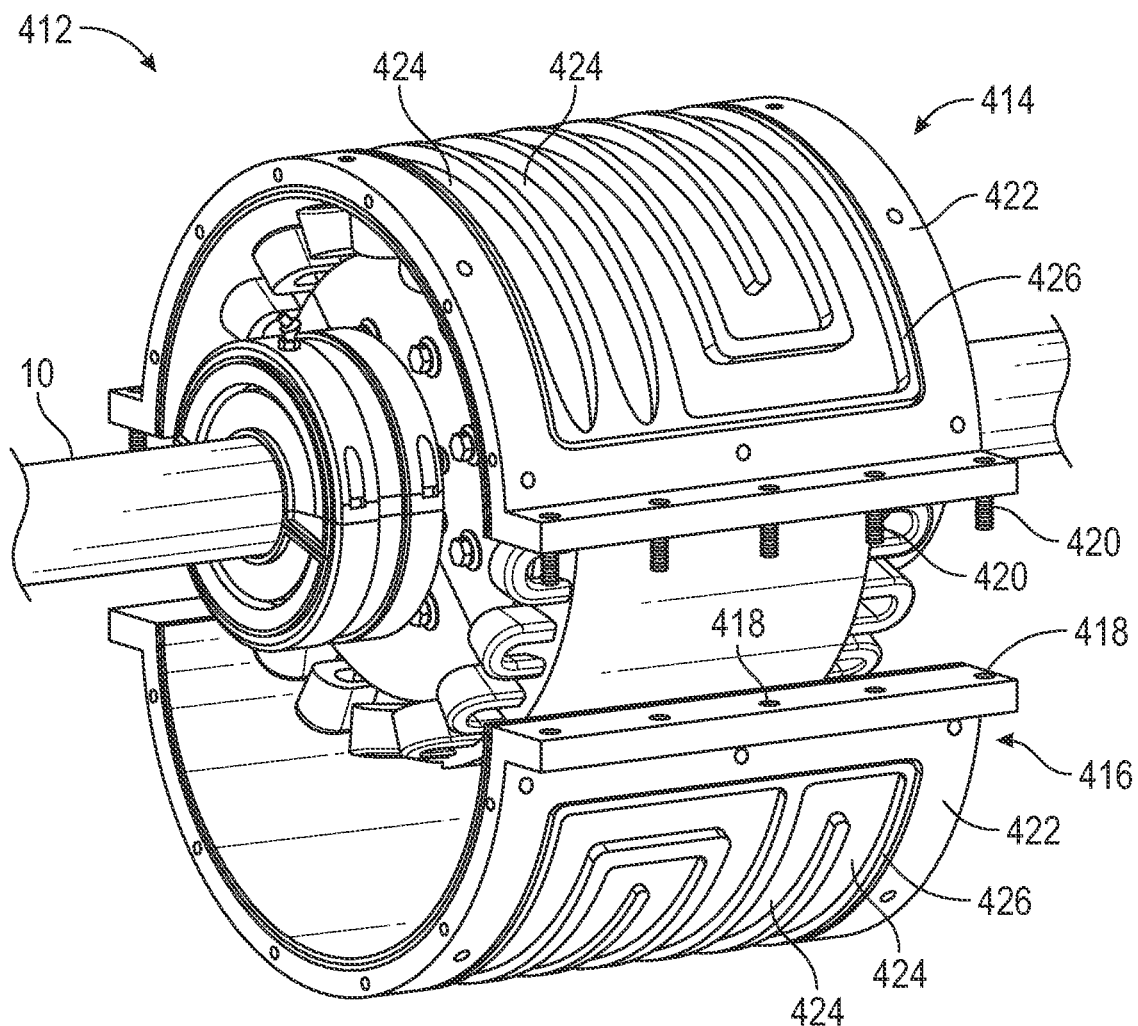
FIG. 24 is a view of a fluid jacket in conjunction with the rotor assembly of FIG. 20, in accordance with an embodiment.

Additionally, similar to described above with respect to FIG. 3, the plurality of stator windings 410 are disposed at a common distance from one another regardless of whether any two adjacent stator windings 410 are each in the stator segments 406, are each in the stator segments 408, or when one adjacent stator winding 410 is in the stator segments 406 and the second adjacent stator winding 410 is in the stator segments 408. In some embodiments, the stator windings 410 maintain symmetry during splitting and the stator 404. Likewise, when the stator segments 406 and the stator segments 408 are directly coupled to one another, the stator 404 comprises a unitary stator (e.g., a stator 404 without intra-segment gaps FIG. 24 illustrates a fluid jacket 412 that may be disposed about the stator 404. The fluid jacket 412, as illustrated, is made up of fluid jacket segment 414 and fluid jacket segment 416 that, when coupled together, form the fluid jacket 412. As illustrated, the fluid jacket segment 416 includes a plurality of apertures 418 that align with guides 420 (e.g., pins or hollow members that accept fasteners such as bolts, screws, pins, and the like) from the corresponding fluid jacket segment 414 so that apertures 418 and the guides 420 mate when the fluid jacket segment 414 and the fluid jacket segment 416 are brought into contact with one another to form the fluid jacket 412 of FIG. 23. It should be noted that the fluid jacket 412 represents one embodiment of a liquid cooling system as a cooling system for the stator 404, however, other configurations for a cooling system (e.g., an air, liquid, or fluid cooling system) of the stator 404 are envisioned. For example, an air cooling system may include an integrated fan that operates to compress air and may, for example, include a fan coupled to the shaft 10 to utilize the rotations of the shaft 10 to propel the fan to compress air that is supplied to the stator 404 to cool the stator 404.

The fluid jacket segment 414 and the fluid jacket segment 416 each include a face (e.g., an inner face) that is disposed circumferentially around the stator 404 when the fluid jacket segment 414 and the fluid jacket segment 416 are coupled. The fluid jacket segment 414 and the fluid jacket segment 416 each also include a face 422 (e.g., an outer face) that is disposed circumferentially around the above describe inner face of the fluid jacket segment 414 and the fluid jacket segment 416. The face 422 for each fluid jacket segment 414 and fluid jacket segment 416 includes one or more cooling channels 424. The one or more cooling channels 424 may provide improved thermal management for stator 404 and may operate to pass a fluid across the face 422 of the of the fluid jacket segment 414 and the fluid jacket segment 416 to operate as a heat exchanger to cool the stator 404. Likewise, a groove or channel 426 may surround the one or more cooling channels 424 to interface with a protrusion of a housing segment that surrounds one or more cooling channels machined into its outer circumference, whereby the one or more cooling channels of the housing segment match the one or more cooling channels 424 of the fluid jacket 412. Additionally, a gasket may be provided on each end of the fluid jacket 412 to be compressed by the housing when the housing segments are coupled to one another.

Figure 25:
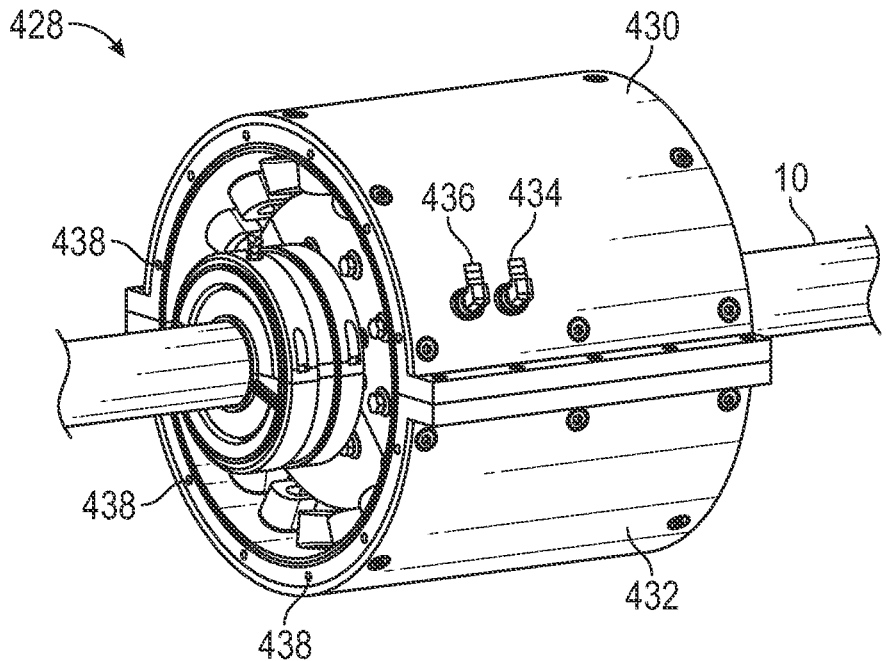
FIG. 25 is a view of a housing in conjunction with the rotor assembly of FIG. 20, in accordance with an embodiment.

FIG. 25 illustrates an example of the housing 428 inclusive of a housing segment 430 and a housing segment 432 described above. As illustrated, the housing 428 includes an inlet 434 and an outlet 436, whereby the inlet 434 transmits a liquid (e.g., water or the like) as a fluid at a first temperature into the one or more cooling channels 424 defined by the housing 428 and the fluid jacket 412 and the outlet 436 removes the liquid at second temperature higher than the first temperature to remove heat from the stator 404. As illustrated, the fluid jacket segment 416 includes a plurality of apertures 418 that align with guides 420 (e.g., pins or hollow members that accept fasteners such as bolts, screws, pins, and the like) from the corresponding fluid jacket segment 414 so that apertures 418 and the guides 420 mate when the fluid jacket segment 414 and the fluid jacket segment 416 are brought into contact with one another to form the fluid jacket 412 of FIG. 23.

Figure 26:
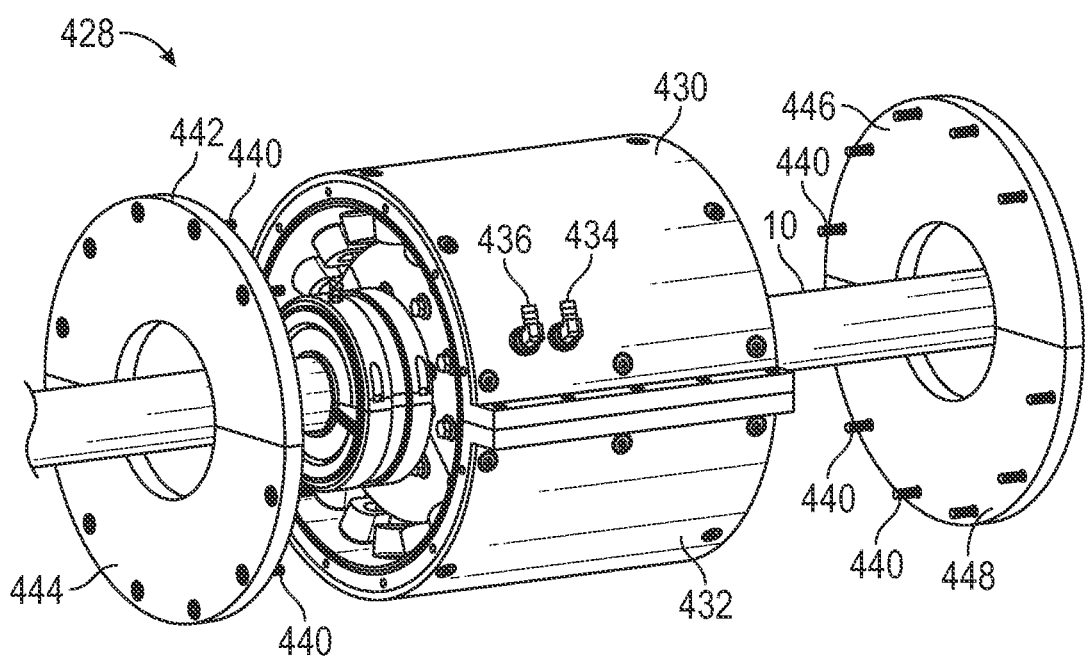
FIG. 26 is a view of end plates of the housing of FIG. 25, in accordance with an embodiment.

As additionally illustrated in FIG. 25, the housing 428 may include a plurality of apertures 438. These apertures 438 align with guides 440 (e.g., pins or hollow members that accept fasteners such as bolts, screws, pins, and the like) from end plate segment 442 and end plate segment 444 of FIG. 26 so that apertures 438 and the guides 440 mate when end plate segment 442 and end plate segment 444 are brought into contact with housing segment 430 and housing segment 432. Also illustrated are end plate segment 446 and end plate segment 448. End plate segment 446 and end plate segment 448 also include guides 440 that mate with when end plate segment 446 and end plate segment 448 are brought into contact with housing segment 430 and housing segment 432. Once coupled, the end plate segment 442, the end plate segment 444, the end plate segment 446, and the end plate segment 448 complete the housing 428. Additionally, as previously noted, the end plate segment 442 and the end plate segment 444 can combine to form an end plate with an inner circumference that is disposed about a groove or channel of bearing 386. Similarly, the end plate segment 446 and the end plate segment 448 can combine to form an end plate with an inner circumference that is disposed about a groove or channel of bearing 388.

Figure 27:
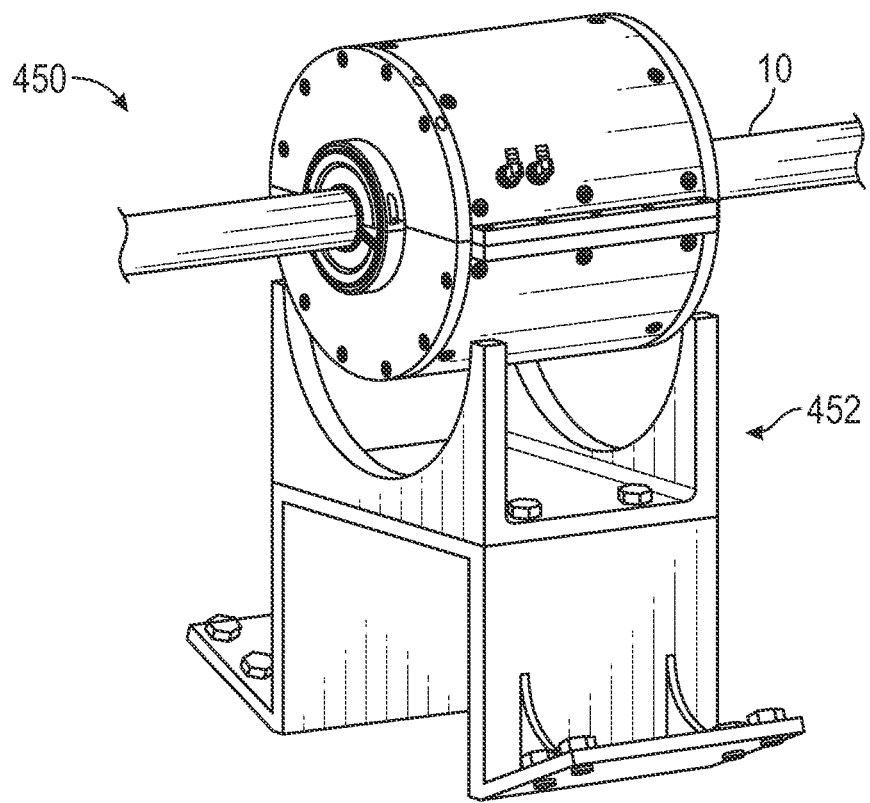
FIG. 27 is a view of an electric motor assembly in conjunction with a frame, in accordance with an embodiment.

An electric motor assembly 450 inclusive of the electric machine 100, the housing 428, and the bearing assembly 390, is illustrated in FIG. 27. Furthermore, as illustrated in FIG. 27, a frame 452 may be disposed beneath the electric motor assembly 450 and one or more fasteners of the housing 428 can couple the electric motor assembly 450 to the frame 452. The electric motor assembly 450 can be designed and implemented in conjunction with a number of differing vessels, for example, as a 75 kilowatt, a 400 kilowatt, a 1 megawatt electric or another output electric motor. In this manner, the electric motor assembly 450 can have varying sizes and/or outputs for use with various vessels and each electric motor assembly 450 can accommodate a range of diameters/circumferences of shafts in line with the description above. Moreover, while the same number of rotor shaft collar segment 334 and rotor shaft collar segment 336, rotor segment 352 and rotor segment 354, bearing segment 392 and bearing segment 394, bearing segment 396 and bearing segment 398, stator segment 406 and stator segment 408, fluid jacket segment 414 and fluid jacket segment 416, housing segment 430 and 432 are provided (i.e. two of each), it will be appreciated that this need not be the case. For example, four rotor segments may be provided to form rotor 356, and six stator segments may be provided to form stator 404. Additionally, the electric motor assembly 450 may be implemented using various types of electric motors, such as an induction motor, a permanent magnet motor, or a reluctance motor (e.g., a motor having a stator coupled to the shaft 10 (either directly to or via a shim) with a rotor disposed about the stator) each separable, i.e., split, in the manner described herein to achieve the result detailed herein regarding installation about an existing shaft 10.

Figure 28:
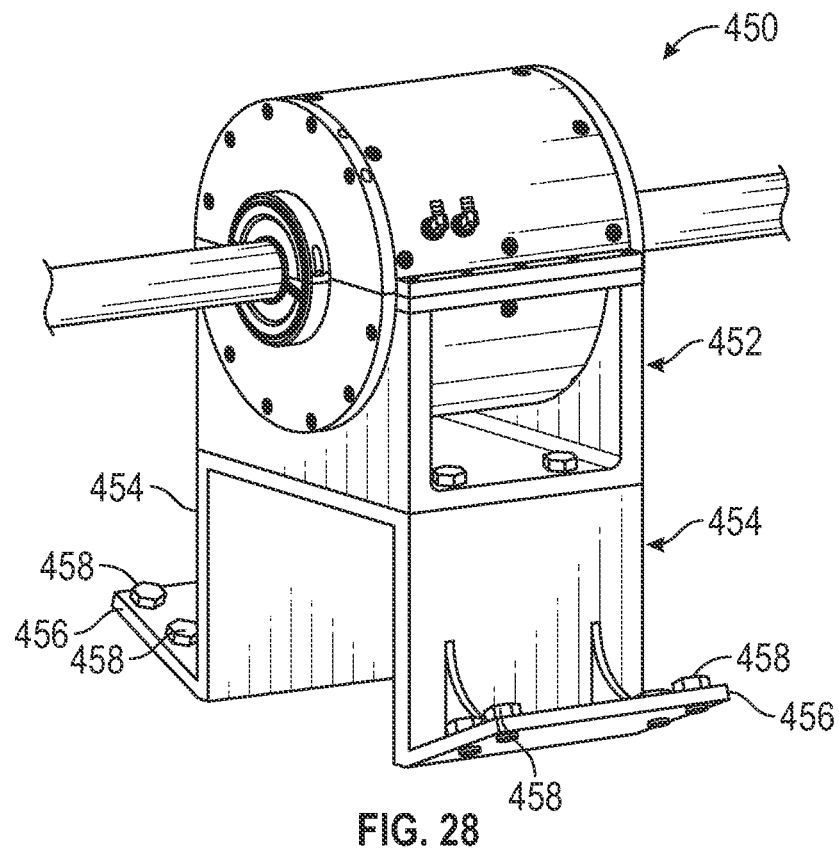
FIG. 28 is a view of mounting elements in conjunction with the electric motor assembly of FIG. 27, in accordance with an embodiment.

Additionally, as illustrated in FIG. 28, the frame 452 may be coupled to or may include legs 454 and/or feet 456. The legs 454 and/or the feet 456 may operate to support the weight of the electric motor assembly 450. In some embodiments, the feet 456 may be directly coupled to a hull of the vessel. In other embodiments, a hull connection point may be connected to the hull of the vessel and the feet 456 are connected to the hull connection point via one or more fasteners 458 (e.g., a bolt or the like). In some embodiments, one or motor mounts may be disposed between the feet 456 and the hull or between the feet 456 and the hull connection point to dampen vibration, i.e., to isolate vibration of the shaft 10 from the hull and/or vice versa.

Figure 29:
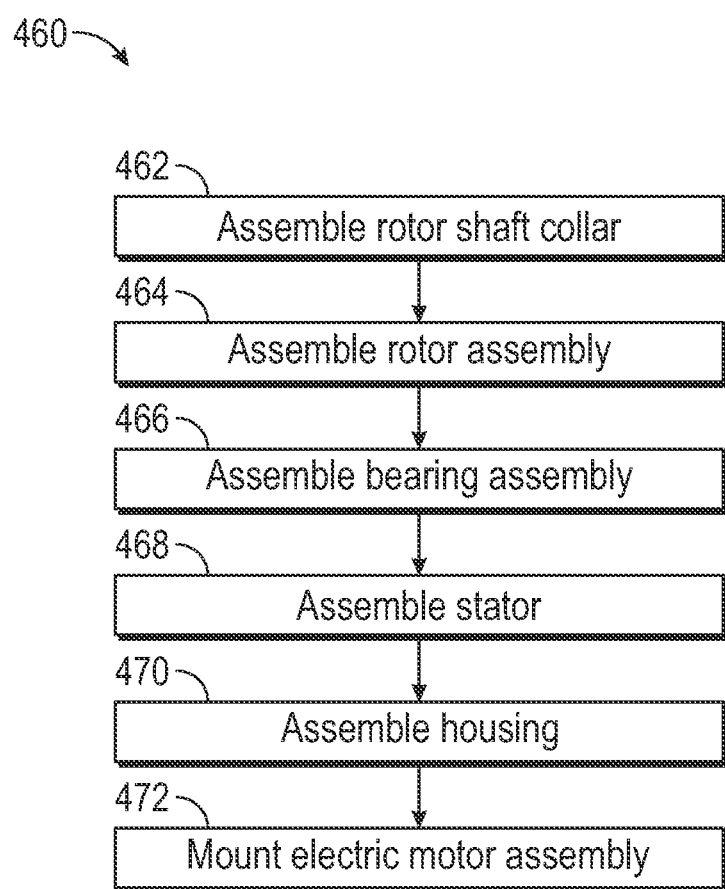
FIG. 29 illustrates a method of assembly of an electric motor and its associated components about an existing shaft in accordance with an embodiment.

FIG. 29 illustrates an embodiment of a method 460 of assembly of an electric motor and its associated components about an existing shaft 10. In step 462, a rotor shaft collar 338 is assembled about an existing shaft 10 of a vessel, as illustrated, for example, in FIGS. 15 and 16 and as described above. In step 464, a rotor 356 and rotor assembly 378 are assembled about the existing shaft 10 of the vessel, as illustrated, for example, in FIGS. 17, 18, 19, and 20 and as described above. In step 466, a bearing assembly 390 is assembled about the existing shaft 10 of the vessel, as illustrated, for example, in FIGS. 21 and 22 and as described above. In step 468, a stator 404 is assembled about the existing shaft 10 of the vessel, as illustrated, for example, in FIG. 23 and as described above. In step 470, a housing 428, which may be inclusive of a fluid jacket 412, is assembled about the existing shaft 10 of the vessel, as illustrated, for example, in FIGS. 24, 25, and 26 and as described above. Finally, in step 472, an electric motor assembly 450 is mounted to a vessel about the existing shaft 10 of the vessel, as illustrated, for example, in FIGS. 27 and 28 and as described above. It should be noted that one or more of the above described steps 462, 464, 466, 468, 470, and 472 may be performed in a different order than listed above.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the concept and non-limiting. It will be understood by persons skilled in the art that other variants and modifications may be made without departing from the scope of the invention, which should not be limited by the preferred embodiments and examples, but should be given the broadest interpretation consistent with the description as a whole.

The invention claimed is:

1. A device, comprising:
a first rotor segment;
a second rotor segment, wherein the first rotor segment and the second rotor segment are configured to be directly coupled together about a shaft to form at least a portion of a unitary rotor;
a first stator segment;
a second stator segment, wherein the first stator segment and the second stator segment are configured to be directly coupled together circumferentially about the shaft, wherein the first stator segment and second stator segment when directly coupled together form at least a portion of a unitary stator circumferentially disposed about the shaft;
a first housing segment; and
a second housing segment, wherein the first housing segment and the second housing segment are configured to be directly coupled together circumferentially about the unitary stator, wherein the first housing segment and second housing segment when directly coupled together form at least a portion of a housing circumferentially disposed about the unitary stator.

2. The device of claim 1, comprising a first rotor shaft collar segment coupled to a second rotor shaft collar to form at least a portion of a rotor shaft collar.

3. The device of claim 2, wherein the rotor shaft collar is configured to directly couple the rotor shaft collar to the shaft.

4. A device, comprising:
a first rotor segment;
a second rotor segment, wherein the first rotor segment and the second rotor segment are configured to be directly coupled together about a shaft to form at least a portion of a unitary rotor;
a first stator segment;
a second stator segment, wherein the first stator segment and the second stator segment are configured to be directly coupled together about the shaft, wherein the first stator segment and second stator segment when directly coupled together form at least a portion of a unitary stator;
a first rotor shaft collar segment coupled to a second rotor shaft collar to form at least a portion of a rotor shaft collar; and a shim, wherein the shim is configured to couple the rotor shaft collar to the shaft.

5. The device of claim 2, wherein the rotor shaft collar is configured to be directly coupled to the unitary rotor.

6. The device of claim 5, wherein the rotor shaft collar comprises a first alignment feature and the unitary rotor comprises a second alignment feature, wherein the first alignment feature is configured to interface with the second alignment feature.

7. The device of claim 1, wherein the first stator segment and the second stator segment when directly coupled together form at least a portion of a balanced polyphase source.

8. The device of claim 1, wherein the first rotor segment comprises a first plurality of magnets, wherein the second rotor segment comprises a second plurality of magnets, wherein the first stator segment comprises a first plurality of windings, wherein the second stator segment comprises a second plurality of windings, wherein the unitary rotor stator is disposed about the unitary rotor.

9. The device of claim 1, wherein the unitary rotor comprises a plurality of magnets buried inside of or disposed on at least one surface of the unitary rotor.

10. The device of claim 1, wherein the unitary rotor is disposed about the unitary stator as part of a reluctance motor.

11. The device of claim 1, comprising a bearing assembly comprising a bearing, wherein the housing comprises an end plate configured to directly contact the bearing.

12. The device of claim 1, comprising a cooling system configured to cool the unitary stator during operation.

13. A method, comprising:
disposing a first rotor shaft collar segment about a shaft of a vessel;
disposing a second rotor shaft collar segment about the shaft of the vessel;
directly coupling the first rotor shaft collar segment to the second rotor shaft collar segment to form at least a portion of a rotor shaft collar about the shaft of the vessel;
disposing a first rotor segment about the rotor shaft collar;
disposing a second rotor segment about the rotor shaft collar; and
directly coupling the first rotor segment to the second rotor shaft collar segment to form at least a portion of a rotor disposed about the rotor shaft collar.

14. The method of claim 13, comprising:
directly disposing the first rotor shaft collar segment on the shaft of the vessel when disposing the first rotor shaft collar segment about the shaft of the vessel; and
directly disposing the second rotor shaft collar segment on the shaft of the vessel when disposing the second rotor shaft collar segment about the shaft of the vessel.

15. The method of claim 13, comprising:
directly coupling a shim to the shaft of the vessel;
directly coupling the shim to the first rotor shaft collar segment when disposing the first rotor shaft collar segment about the shaft of the vessel; and
directly coupling the shim to the second rotor shaft collar segment when disposing the second rotor shaft collar segment about the shaft of the vessel.

16. The method of claim 13, comprising:
disposing a first stator segment about the rotor;
disposing a second stator segment about the rotor; and
directly coupling the first stator segment to the second stator segment to form at least a portion of a stator.

17. The method of claim 16, comprising disposing a housing about the stator to form an electric motor assembly.

18. The method of claim 17, comprising mounting the electric motor assembly on a hull of the vessel.

19. A device, comprising:
a rotor shaft collar that when in operation contacts a shaft of a vessel, wherein the rotor shaft collar comprises a first rotor shaft collar segment directly coupled to a second rotor shaft collar segment;
a rotor that when in operation directly contacts and circumscribes the rotor shaft collar, wherein the rotor comprises a first rotor segment comprising directly coupled to a second rotor segment comprising; and
a stator that when in operation is disposed about the rotor, wherein the stator comprises a first stator segment directly coupled to a second stator segment.

20. The device of claim 19, comprising a shim, wherein the rotor shaft collar when in operation contacts the shaft of the vessel via the shim.

\* \* \* \* \*